(12) United States Patent
Flake et al.

(10) Patent No.: US 8,533,049 B2
(45) Date of Patent: Sep. 10, 2013

(54) VALUE ADD BROKER FOR FEDERATED ADVERTISING EXCHANGE

(75) Inventors: Gary W. Flake, Bellevue, WA (US); Brett D. Brewer, Sammamish, WA (US); Christopher A. Meek, Kirkland, WA (US); David Max Chickering, Bellevue, WA (US); Jody D. Biggs, Redmond, WA (US); Ewa Dominowska, Kirkland, WA (US); Brian Burdick, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1220 days.

(21) Appl. No.: 11/762,625

(22) Filed: Jun. 13, 2007

(65) Prior Publication Data

US 2008/0103969 A1    May 1, 2008

Related U.S. Application Data

(60) Provisional application No. 60/862,969, filed on Oct. 25, 2006.

(51) Int. Cl.
*G06Q 30/00* (2012.01)

(52) U.S. Cl.
USPC ............. 705/14.71; 705/14.16; 705/14.69; 705/14.7

(58) Field of Classification Search
USPC ............. 705/14, 14.71, 14.16, 14.69, 14.7
See application file for complete search history.

(56) References Cited

U.S. PATENT DOCUMENTS

| | | | |
|---|---|---|---|
| 5,794,210 A | 8/1998 | Goldhaber et al. | |
| 5,855,008 A | 12/1998 | Goldhaber et al. | |
| 5,999,975 A | 12/1999 | Kittaka et al. | |
| 6,036,601 A | 3/2000 | Heckel | |
| 6,134,532 A | 10/2000 | Lazarus et al. | |
| 6,286,005 B1 | 9/2001 | Cannon | |
| 6,324,519 B1 * | 11/2001 | Eldering | 705/14.66 |
| 6,487,538 B1 | 11/2002 | Gupta et al. | |
| 6,808,173 B2 | 10/2004 | Snow | |

(Continued)

FOREIGN PATENT DOCUMENTS

| | | |
|---|---|---|
| EP | 1209600 A1 | 5/2002 |
| JP | 2004-157585 A | 1/2002 |

(Continued)

OTHER PUBLICATIONS

International Search Report dated Feb. 12, 2008 for PCT Application U.S. Appl. No. PCT/US2007/081840, 3 Pages.

(Continued)

*Primary Examiner* — Michael Bekerman
*Assistant Examiner* — Luis Brown
(74) *Attorney, Agent, or Firm* — Shook, Hardy & Bacon L.L.P.

(57) ABSTRACT

For a multi-party advertising exchange, including publishing entities and advertising entities from disparate advertising networks, which facilitates transactions for publishing inventory, a value add broker is provided to aggregate information from third parties having valuable information for input to the exchange or to perform services that are valuable to transactions in the exchange. The valuable information or services further facilitate the transactions for the publishing inventory automatically generating a benefit for the third parties providing the valuable information or services commensurate with the value added to the transactions.

20 Claims, 14 Drawing Sheets

(56) References Cited

U.S. PATENT DOCUMENTS

| | | | |
|---|---|---|---|
| 7,050,990 B1* | 5/2006 | Chu et al. | 705/14 |
| 7,222,099 B2 | 5/2007 | Forsythe et al. | |
| 7,225,151 B1 | 5/2007 | Konia | |
| 7,496,943 B1 | 2/2009 | Goldberg et al. | |
| 7,577,582 B1 | 8/2009 | Ojha et al. | |
| 7,630,986 B1 | 12/2009 | Herz et al. | |
| 7,657,626 B1 | 2/2010 | Zwicky | |
| 7,680,715 B2 | 3/2010 | Waelbroeck et al. | |
| 8,447,651 B1 | 5/2013 | Scholl et al. | |
| 2001/0020236 A1 | 9/2001 | Cannon | |
| 2001/0047297 A1 | 11/2001 | Wen | |
| 2002/0013167 A1 | 1/2002 | Spaur et al. | |
| 2002/0046157 A1 | 4/2002 | Solomon | |
| 2002/0049667 A1 | 4/2002 | Navani | |
| 2002/0062248 A1 | 5/2002 | Sakirai | |
| 2002/0082983 A1 | 6/2002 | Oshiba et al. | |
| 2002/0107779 A1 | 8/2002 | Maltzman | |
| 2002/0116302 A1 | 8/2002 | Wilmes et al. | |
| 2002/0120552 A1 | 8/2002 | Grey et al. | |
| 2002/0188487 A1 | 12/2002 | Fox | |
| 2003/0036975 A1 | 2/2003 | Martin et al. | |
| 2003/0120662 A1 | 6/2003 | Vishik | |
| 2003/0135460 A1 | 7/2003 | Talegon | |
| 2003/0149975 A1* | 8/2003 | Eldering et al. | 725/34 |
| 2003/0182413 A1* | 9/2003 | Allen et al. | 709/223 |
| 2003/0187773 A1 | 10/2003 | Santos et al. | |
| 2004/0103024 A1 | 5/2004 | Patel et al. | |
| 2004/0117292 A1 | 6/2004 | Brumfield et al. | |
| 2004/0128224 A1 | 7/2004 | Dabney et al. | |
| 2004/0133492 A1 | 7/2004 | Stricker | |
| 2004/0148222 A1 | 7/2004 | Sabella et al. | |
| 2004/0181606 A1 | 9/2004 | Astor et al. | |
| 2004/0225576 A1 | 11/2004 | Mizuno et al. | |
| 2004/0254853 A1 | 12/2004 | Heene et al. | |
| 2005/0021441 A1 | 1/2005 | Flake et al. | |
| 2005/0027594 A1 | 2/2005 | Yasnovsky et al. | |
| 2005/0043998 A1 | 2/2005 | Bross et al. | |
| 2005/0065844 A1 | 3/2005 | Raj et al. | |
| 2005/0097024 A1 | 5/2005 | Rainey et al. | |
| 2005/0097204 A1 | 5/2005 | Horowitz et al. | |
| 2005/0119934 A1 | 6/2005 | Kamiyama | |
| 2005/0144068 A1 | 6/2005 | Calabria et al. | |
| 2005/0148377 A1 | 7/2005 | Goldberg et al. | |
| 2005/0177431 A1 | 8/2005 | Willis et al. | |
| 2005/0246231 A1 | 11/2005 | Shkedi | |
| 2005/0289005 A1 | 12/2005 | Ferber | |
| 2006/0004633 A1 | 1/2006 | Ashbaugh | |
| 2006/0026061 A1 | 2/2006 | Collins | |
| 2006/0026064 A1 | 2/2006 | Collins | |
| 2006/0041480 A1 | 2/2006 | Briggs | |
| 2006/0041500 A1 | 2/2006 | Diana | |
| 2006/0080171 A1 | 4/2006 | Jardins | |
| 2006/0095361 A1 | 5/2006 | Rude | |
| 2006/0122879 A1 | 6/2006 | O'Kelley | |
| 2006/0129467 A1 | 6/2006 | Chu et al. | |
| 2006/0136294 A1 | 6/2006 | Linden | |
| 2006/0155597 A1 | 7/2006 | Gleason | |
| 2006/0155638 A1 | 7/2006 | de la Motte | |
| 2006/0161553 A1 | 7/2006 | Woo | |
| 2006/0173744 A1 | 8/2006 | Kandasamy et al. | |
| 2006/0174170 A1 | 8/2006 | Garland | |
| 2006/0212350 A1 | 9/2006 | Ellis et al. | |
| 2006/0248035 A1 | 11/2006 | Gendler et al. | |
| 2006/0248209 A1 | 11/2006 | Chiu et al. | |
| 2006/0271359 A1 | 11/2006 | Khalil et al. | |
| 2006/0271425 A1 | 11/2006 | Goodman et al. | |
| 2006/0271429 A1 | 11/2006 | Borgs et al. | |
| 2006/0271438 A1 | 11/2006 | Shotland et al. | |
| 2007/0011050 A1 | 1/2007 | Klopf et al. | |
| 2007/0027753 A1 | 2/2007 | Collins | |
| 2007/0027765 A1 | 2/2007 | Collins et al. | |
| 2007/0027771 A1 | 2/2007 | Collins et al. | |
| 2007/0027772 A1 | 2/2007 | Chou | |
| 2007/0033107 A1 | 2/2007 | Ubale et al. | |
| 2007/0038516 A1 | 2/2007 | Apple et al. | |
| 2007/0050254 A1 | 3/2007 | Driscoll | |
| 2007/0061204 A1 | 3/2007 | Ellis et al. | |
| 2007/0067297 A1 | 3/2007 | Kiblickis | |
| 2007/0100708 A1 | 5/2007 | Smith et al. | |
| 2007/0130005 A1* | 6/2007 | Jaschke | 705/14 |
| 2007/0130009 A1 | 6/2007 | Steelberg | |
| 2007/0143186 A1 | 6/2007 | Apple et al. | |
| 2007/0150387 A1 | 6/2007 | Seubert et al. | |
| 2007/0179849 A1 | 8/2007 | Jain | |
| 2007/0192190 A1 | 8/2007 | Granville | |
| 2007/0192356 A1 | 8/2007 | O'Kelley et al. | |
| 2007/0198350 A1 | 8/2007 | O'Kelley et al. | |
| 2007/0198597 A1 | 8/2007 | Betz et al. | |
| 2007/0199017 A1 | 8/2007 | Cozen et al. | |
| 2007/0214045 A1 | 9/2007 | Subramanian | |
| 2007/0239535 A1 | 10/2007 | Koran et al. | |
| 2007/0239560 A1 | 10/2007 | McGuire | |
| 2007/0244760 A1* | 10/2007 | Bodnar et al. | 705/14 |
| 2007/0260520 A1 | 11/2007 | Jha et al. | |
| 2007/0260596 A1 | 11/2007 | Koran et al. | |
| 2007/0271145 A1 | 11/2007 | Vest | |
| 2007/0276800 A1 | 11/2007 | Lee | |
| 2007/0288350 A1* | 12/2007 | Bykowsky | 705/37 |
| 2007/0294126 A1 | 12/2007 | Maggio | |
| 2008/0033776 A1 | 2/2008 | Marchese | |
| 2008/0097829 A1 | 4/2008 | Ritter | |
| 2008/0147487 A1 | 6/2008 | Hirshberg | |
| 2008/0154784 A1 | 6/2008 | Veeraraghavan | |
| 2009/0198684 A1 | 8/2009 | Collins et al. | |

FOREIGN PATENT DOCUMENTS

| | | |
|---|---|---|
| JP | 2002117117 A | 4/2002 |
| JP | 2002183506 A | 6/2002 |
| JP | 2002352114 A | 12/2002 |
| JP | 2003-187108 A | 4/2003 |
| KR | 1020020012326 A | 2/2002 |
| KR | 1020020067941 A | 8/2002 |
| WO | 0024484 A1 | 5/2000 |
| WO | WO0042593 A1 | 7/2000 |
| WO | WO0140893 A2 | 6/2001 |
| WO | 2004114083 A2 | 12/2004 |
| WO | 2007047310 A2 | 10/2005 |
| WO | 2006110873 A2 | 10/2006 |

OTHER PUBLICATIONS

OA dated Dec. 31, 2008 for U.S. Appl. No. 11/675,343, 34 pages.

OA Dated Dec. 31, 2008 for U.S. Appl. No. 11/735,753, 35 pages.

OA dated Feb. 5, 2009 for U.S. Appl. No. 11/747,963, 34 pages.

OA Dated Dec. 24, 2008 for U.S. Appl. No. 11/753,790, 30 pages.

Bjorn Knutsson. Peer-to-Peer Support for Massively Multiplayer Games. Jul. 4, 2004. http://www.cs.ualberta.ca/~anup/Courses/604/Presentation_files/Lihang/P2Pgames_Infocom04_Upenns.pdf.

Monty Giaveli. Connect 2.01. Sep. 5, 2005. http://www.allworldsoft.com/software/4-906-connect.htm.

Haring. "The Virtual Location of E-Tailers: Evidence from a B2C E-Commerce Marker" (2005) ZEW (Centre for European Economic Research) Discussion Paper No. 05-52, 26 pages.

Madani, et al. "Contextual Recommender Problems" (2005) ACM, pp. 86-89.

Lan Zhao, et al., "A network modeling approach for the optimization of Internet-based advertising strategies and pricing with a quantitative explanation of two paradoxes", Aug. 31, 2007, 2 pages. http://portal.acm.org/citation.cfm?id=1188190.

Bae, et al. "The Profitability of Index Futures Arbitrage: Evidence from Bid-Ask Quotes," http://home.ust.hk/~kachan/research/arbitrage.pdf, May 1998, 32 pages.

"Index-Futures Arbitrage and the Behavior of Stock Index Futures Prices," http://press.princeton.edu/books/lo/chapt11.pdf, last accessed Apr. 4, 2007.

"Arbitage Opportunities, Brokerage, Finance businesses, miscellaneous," http://www.experienced-people.co.uk/1042-top-ways-of-making-money-online/5-last-but-not-least.htm, last accessed Apr. 4, 2007.

OA dated Nov. 24, 2009 for U.S. Appl. No. 11/762,632—17 pages.

OA dated Nov. 24, 2009 for U.S. Appl. No. 11/742,199—16 pages.

OA dated Nov. 24, 2009 for U.S. Appl. No. 11/735,737—16 pages.
OA dated De. 7, 2009 for U.S. App. No. 11/864,481 18 pages.
OA dated Dec. 10, 2009 for U.S. Appl. No. 11/748,333 14 pages.
Final OA dated Dec. 12-24, 2009 for U.S. Appl. No. 11/747,968 15 pages.
OA dated Jan. 25, 2010 for U.S. Appl. No. 11/675,343 15 pages.
Notice of Allowance dated Jan. 15, 2010 for U.S. Appl. No. 11/747,963 25 pages.
OA dated Jan. 29, 2010 for U.S. Appl. No. 11/753,790 15 pages.
OA dated Nov. 24, 2009 for U.S. Appl. No. 11/735,742—18 pages.
Final Office Action U.S. Appl. No. 11/675,343, mailed: Feb. 1, 2011, 22 pages.
Final Office Action U.S. Appl. No. 11/753,790, mailed: Feb. 2, 2011, 13 pages.
NonFinal Office Action dated Feb. 4, 2013 for U.S. Appl. No. 11/735,742, 26 pages.
NonFinal Office Action dated Mar. 26, 2013 for U.S. Appl. No. 11/762,632, 19 pages.
Final Office Action dated Mar. 12, 2013 for U.S. Appl. No. 11/753,790, 21 pages.
Final Office Action dated Nov. 8, 2010 for U.S. Appl. No. 11/753,784.
Final Office Action dated Nov. 23, 2010 for U.S. Appl. No. 11/762,632.
Final Office Action dated Oct. 27, 2010 for U.S. Appl. No. 11/747,968.
Final Office Action dated Oct. 27, 2010 for U.S. Appl. No. 11/735,753.
Non-Final Office Action dated Dec. 7, 2010 for U.S. Appl. No. 11/864,481.
Final Office Action dated Dec. 22, 2010 for U.S. Appl. No. 11/763,542.
NonFinal Office Action in U.S. Appl. No. 11/735,753, mailed Nov. 6, 2012, 14 pages.
NonFinal Office Action in U.S. Appl. No. 11/762,243, mailed Dec. 10, 2012, 10 pages.
Final OA dated Dec. 4-12, 2010 for U.S. Appl. No. 11/735,753.
Final OA dated Dec. 5-12, 2010 for U.S. Appl. No. 11/735,742.
Final OA dated Dec. 6-21, 2010 for U.S. Appl. No. 11/742,199.
NF OA dated Dec. 6-24, 2010 for U.S. Appl. No. 11/762,632.
Final OA dated Dec. 6-8, 2010 for U.S. Appl. No. 11/748,333.
NF OA dated Dec. 5-26, 2010 for U.S. Appl. No. 11/864,481.
NF OA dated Dec. 4-13, 2010 for U.S. Appl. No. 11/747,968.
First OA dated Dec. 6-8, 2010 for U.S. Appl. No. 11/763,542.
First OA dated Dec. 5-11, 2010 for U.S. Appl. No. 11/753,784.
Final OA dated Dec. 4-12, 2010 for U.S. Appl. No. 11/762,243.
Final OA dated Dec. 5-25, 2010 for U.S. Appl. No. 11/735,737.
OA dated Dec. 8-23, 2010 for U.S. Appl. No. 11/675,343.
OA dated Dec. 8-16, 2010 for U.S. Appl. No. 11/753,790.
Final Office Action mailed Apr. 10, 2013 regarding U.S. Appl. No. 11/762,243, 14 pages.
Notice of Allowance mailed Jun. 6, 2013 regarding U.S. Appl. No. 11/763,542, 13 pages.
Final Office Action mailed May 6, 2013 regarding U.S. Appl. No. 11/735,753, 16 pages.
Final Office Action mailed Jun. 18, 2013 regarding U.S. Appl. No. 11/735,742, 23 pages.

* cited by examiner

VALUE ADD BROKER FOR FEDERATED ADVERTISING EXCHANGE

CROSS REFERENCE TO RELATED APPLICATIONS

This application claims priority to U.S. Patent Application Ser. No. 60/862,969, filed on Oct. 25, 2006, entitled "DISTRIBUTED ARCHITECTURES FOR ONLINE ADVERTISING", the entirety of which is incorporated herein by reference.

TECHNICAL FIELD

The subject disclosure relates to a value add broker for facilitating advertising transactions in a federated online advertising environments including participants across different advertising networks.

BACKGROUND

Conventionally, large web search engines have sold advertising space based on keyword-driven search results. For example, Yahoo! conducts auctions for certain keywords, and the highest bidders have their ads placed on pages containing Yahoo! search results, or they obtain preferred placement among the search results, i.e., at the top of the results list.

As web advertising has developed, a number of companies are acquiring large publisher bases from which they can sell advertisements. For instance, Google is signing up publishers into their AdSense ad network. Advertisers pay Google to serve advertisements to participants of the AdSense network. Google then pays some or all of the advertising revenue to the individual publishers. For example, a publisher in the AdSense network may have an article on its website that talks about digital cameras, and Google's AdSense displays digital camera advertisements from advertisers in the AdSense network on that website. Google auctions off the "digital camera" keyword to advertisers in its AdSense network and displays ads from the highest bidders.

However, there are a number of problems with this proprietary ad network model. First, companies that are building ad networks have an inherent conflict of interest because they represent both the publisher and the advertiser. Second, because there are multiple companies that are creating ad networks, advertisers have the burden of managing buys across many ad networks, which results in significant cost and complexity to the advertiser. Third, because publishers are for all practical purposes locked into a single ad network, the advertiser competition is limited, which results in lower return for the publishers. Fourth, the lack of general standards around terms and conditions, and behavioral segmentation is a major obstacle to reaching the full market value of online display advertising. There is also no current standardization across publishers for accepted media types and ad formats. Fifth, smaller publishers currently have very little power individually, even if they serve a hard-to-reach audience. Additionally, ISPs and other owners of large user databases are not realizing the full value of the information they have due to privacy concerns and lack of a proper marketplace.

Additionally, due to the variety of disparate advertising networks facing potential advertisers and publishers alike, the market for advertising becomes fragmented into micro-markets that are not in equilibrium with one another. Thus, determining optimal advertising expenditure can be difficult and subject to guesswork. In addition to the fragmentation of advertising markets introduced by the above-described proprietary, closed advertising networks, expected return on investment for advertising transactions is difficult for participants to determine or calculate, partly because of factors that can never be determined, but also partly because arms length transactions between publishers and advertisers do not take into account all information, or value, that may be available by private or public third party entities about the transactions.

In short, all that a publishing entity knows today about how a set of prospective advertising transactions is likely to perform is provided either by the proprietary, closed advertising network itself (inherently a biased or incomplete view) or by the publishing entity itself. Similarly, all that an advertising entity knows today about how a set of prospective advertising transactions is likely to perform is provided by the network or by the advertising entity itself. Accordingly, transactions today are based on an inherently incomplete view of expected results from entering into them. Hence, an improved online advertising marketplace is desired where third party entities are able to add value to the online advertising marketplace in one form or another, making a more efficient and certain marketplace.

It would be further desirable to enable third party entities to communicate with a federated online advertising environment capable of performing transactions for participants from a variety of disparate advertising networks to store and aggregate value added to the federated environment by potential value add providers to the overall benefit of everyone who participates in the marketplace. In addition, since value may be defined according to different models in the different advertising networks, it would be desirable to aggregate such value according to a standard model, or common representation, so that valuable additions by third party entities across disparate advertising networks can be compared. Such comparisons would allow participants to advertising transactions to make better, more rational decisions about the expected return on investment for advertising dollars based on a collective understanding of additional value added to a federated advertising exchange across different advertising networks by various third party entities.

The above-described deficiencies of current advertising environments are merely intended to provide an overview of some of the problems of today's advertising environments, and are not intended to be exhaustive. Other problems with the state of the art may become further apparent upon review of the description of various non-limiting embodiments of the invention that follows.

SUMMARY

For a multi-party advertising exchange, including publishing entities and advertising entities from disparate advertising networks, which facilitates transactions for publishing inventory, the invention provides a value add broker to aggregate information from third parties having valuable information for input to the exchange or to perform services that are valuable to transactions in the exchange. The valuable information or services further facilitate the transactions for the publishing inventory automatically generating a benefit for the third parties providing the valuable information or services commensurate with the value provided to the transactions. Various value add broker embodiments of the invention include any entities that aggregate information or perform services that is valuable to transactions in the advertising exchange.

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments of the invention in a simplified form as a prelude to the more detailed description of the various embodiments of the invention that follows.

BRIEF DESCRIPTION OF THE DRAWINGS

Various embodiments of value add broker(s) for a federated online advertising marketplace in accordance with the present invention are further described with reference to the accompanying drawings in which.

DETAILED DESCRIPTION

Overview

In various non-limiting embodiments, the invention is described in the context of a distributed architecture for online advertising, i.e., a market mechanism that manages the exchange of advertising goods among multiple participants on the advertising and/or publishing side. For instance, for a multi-party advertising exchange, the invention enables third parties to communicate with the advertising marketplace in a way that adds value to or otherwise facilitates one or more transactions in the exchange. Wherever a party to a prospective transaction in the exchange, either on the publishing or advertising side, would benefit from additional information or a service or action taken by a third party, there is an opportunity for that third party to bridge the gap by providing the value to the exchange. By matching the need for additional value to the provision of that additional value, the marketplace becomes more efficient. The invention thus provides a value add broker infrastructure for a federated advertising exchange by which third parties can communicate with the exchange to add value, which is collected in the exchange according to a common or normalized representation for use across the different advertising networks of the exchange.

A simplified overview has been provided in the present section to help enable a basic or general understanding of various aspects of exemplary, non-limiting embodiments that follow in the more detailed description and the accompanying drawings. This overview section is not intended, however, to be considered extensive or exhaustive. Instead, the overview presents some concepts related to some exemplary non-limiting embodiments of the invention in a simplified form as a prelude to the more detailed description of these and various other embodiments of the invention that follow.

Exemplary Operating Environment(s)

Figure 1:
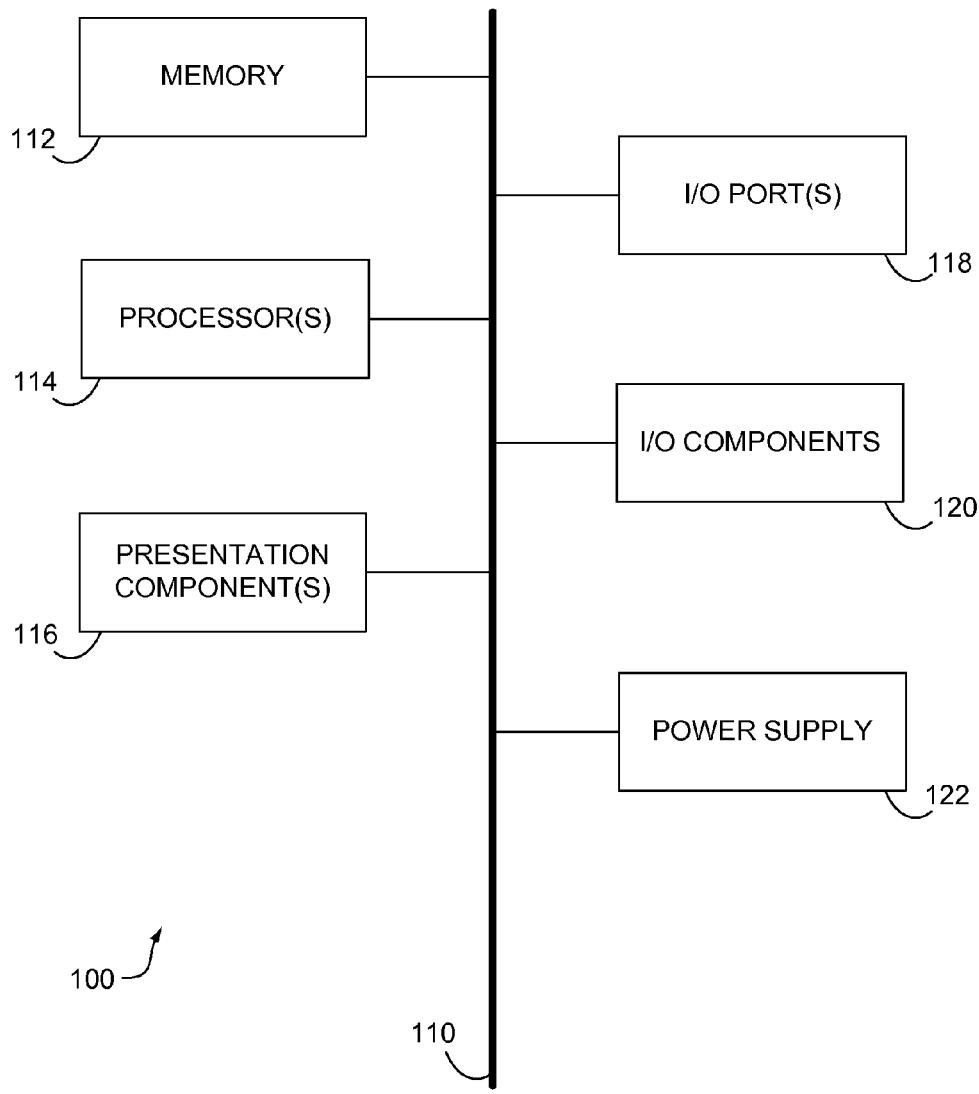
FIG. 1 is a block diagram of a computing system environment suitable for use in implementing the present invention.

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components illustrated. In accordance with the invention, participants can communicate with an advertising exchange via one or more computing devices 100, and the advertising exchange may also comprise one or more computing devices 100, in order to carry out one or more aspects of the invention described in detail below.

In this regard, the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following elements: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory, or otherwise communicate with memory. It should be noted that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Architecture(s) and Environments for Value Add Brokers for Online Advertising

Figure 2:
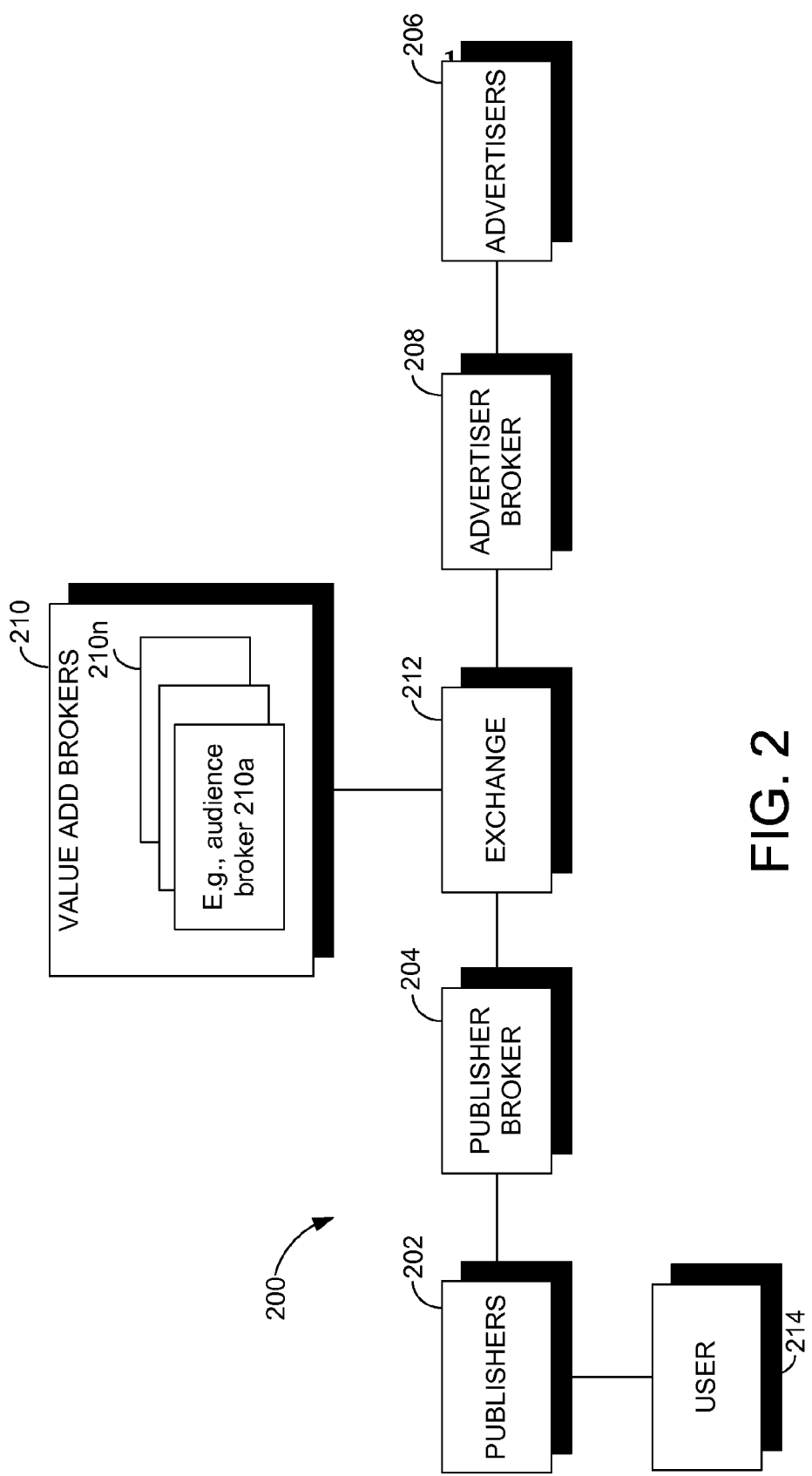
FIG. 2 illustrates a distributed architecture for online advertising according to embodiments of the present invention.

Exemplary online advertising environments or architectures in which one or more of the various embodiments of the value add brokering techniques in accordance with the present invention may be deployed or implemented are now described, followed by additional detail about different types of value add brokers that may operate in such environments. For instance, FIG. 2 illustrates an exemplary federated architecture 200 for online advertising, which comprises publishers 202. For purposes of explanation only, publishers 202 will be discussed herein as a group of any number of publishers. However, embodiments of the present invention are not limited to a group of publishers, as a single publisher is sufficient. Also, embodiments of the present invention are not limited to a single group of publishers, as any number of groups of publishers may be present in architecture 200.

In an embodiment, each publisher is a content provider. For example, a construction worker who operates a single page website on which he posts a weblog (blog) may be a publisher. In another example, a media company such as Disney, who operates a huge website with many pages of content may also be a publisher. Publishers 202 are intended to represent any number of types, sizes, sophistication levels, etc. of publishers. In an embodiment, publishers 202 desire to sell advertisement space on their websites to advertisers 206 (discussed below).

Architecture 200 also comprises publisher broker 204. For purposes of explanation only, only one publisher broker will be discussed herein. However, embodiments of the present invention are not limited to a single publisher broker, as any number of publisher brokers may exist. In an embodiment, publisher broker 204 is an aggregator of publishers. Specifically, publisher broker 204 is an entity that represents publishers 202 with any one or more of the goals of maximizing ad revenue, ensuring quality ads, etc. Publisher broker 204 breaks the conflict of interest that is inherent in systems such as Google's AdSense by solely focusing on managing publishers 202's yield. Publisher broker 204 allows small and mid-size publishers (such as those that may be represented by publishers 202) to aggregate in order to drive higher yield for themselves. In an embodiment, publisher broker 204 maintains a user interface through which it interacts with publishers 202 and through which it manages publishers 202's preferences.

In an embodiment, publisher broker 204 comprises a publisher center and a publisher delivery system. The publisher center allows publishers to manage their preferences. The publisher delivery system is used to calculate the ask for a given page view on the publisher's site, and potentially enrich the available user data in the request. In an embodiment, the ask is an asking price. However, embodiments are not so limited, as the ask may be, e.g., a minimum cost-per-click, minimum relevance, some other performance metric, etc.

The publisher center establishes traffic inventory groupings in the system and sets asks. When a user makes a page request to the publisher, the publisher populates their page with some scripting that sets up a call to the publisher broker. The publisher may add in some information about the user to the call to the publisher broker (the incentive would be that more publishers would want to use a publisher broker that had this sort of value added service). The publisher broker determines what the ask should be for a particular request, given the user information present, the inventory grouping that the request falls into, and the rules the publisher has set up around that information. Additionally, the publisher broker will pass along the maximum amount that the publisher is willing to pay to have any unknown data attributes about the user populated for this request. Finally, the publisher broker encodes this information into a request URL that it sends back to the user as a redirection URL. When all transactions have occurred in the exchange (see below), a call back is provided to the publisher broker stating whether and how many ads were displayed, what the publisher broker can expect in terms of a payment, and which incremental attributes about the user were filled, for instance, by a value add broker 210 (described in more detail below) in accordance with the invention.

Architecture 200 also comprises advertisers 206. For purposes of explanation only, advertisers 206 will be discussed herein as a group of any number of advertisers. However, embodiments of the present invention are not limited to a group of advertisers, as a single advertiser is sufficient. Also, embodiments of the present invention are not limited to a single group of advertisers, as any number of groups of advertisers may be present in architecture 200.

In some cases, publishers may be interested in the certain statistical information, such as audience information, independently of the advertisers on the advertising exchange. For example, a publisher may want to show different content on their web site to users based on the gender of the users, e.g., to attract more people to the site. In this regard, the publisher may be interested in buying audience information for presentation purposes, independently of the advertisers in the exchange. Thus, both advertisers and publishers participating in an advertising exchange are interested in potentially valuable information, such as audience information, and the wider sweeping knowledge base gained by the normalized value add space stored in accordance with the invention.

In an embodiment, each advertiser purchases ad space on websites, though any digital representation of advertising can be included in embodiments of the invention. For instance, in addition to any digital representation of advertising, an advertising exchange may reflect the user attributes of billboards, printed media and publications, TV, Radio, etc., or any traditional means for publishing advertising, as long as the advertising is purchased and sold within the exchange. In this respect, any of the foregoing media can be characterized by information, such as user attributes of the viewers of publishing inventory, which may add value to one or more transactions in the exchange. One way to add value is to provide better pricing information, a form of direct value. Another way to provide value is information that facilitates one or more transactions to occur where they may not have otherwise occurred due to uncertainty. Accordingly, for any media represented in the exchange, the invention may act to normalize value added to the exchange from third party value add providers or brokers, and to track the performance of that value, i.e., whether the value actually provided corresponds to its predicted value.

For example, a local businessperson who operates a website for her small flower shop and who advertises on a neighborhood homeowners' association website may be an advertiser. In another example, a massive corporate entity such as General Motors, which has thousands of products and services, and which advertises on thousands of automotive-related websites may also be an advertiser. Advertisers 206 are intended to represent any number of types, sizes, sophistication levels, etc. of advertisers. In an embodiment, advertisers 206 desire to pay money to place ads on publishers 202's websites, and particularly, where value added by a third party indicates that the advertising transaction is likely to provide a good return on investment.

Architecture 200 also comprises advertiser broker 208. For purposes of explanation only, only one advertiser broker will be discussed herein. However, embodiments of the present invention are not limited to a single advertiser broker, as any number of advertiser brokers may exist. In an embodiment, advertiser broker 208 is an aggregator of advertisers. Specifically, advertiser broker 208 is an entity that represents advertisers 206 typically with the goal of optimizing advertisers 206's spending and placing monetary values on displaying advertising of a particular format, on a particular website, to a particular audience. In an embodiment, advertiser broker 208 maintains a user interface through which it interacts with advertisers 206, and through which it manages advertisers 206's preferences, such as preferences for particular user data attributes or other value added information or services in accordance with value brokering of the invention. However, embodiments of the present invention are not limited to any particular advertiser preferences.

In an embodiment, an advertiser sets up ads in the advertiser broker system, but has no further interaction with the exchange (see below) or end user until such a point as the end user clicks on their ad. This means that the advertiser does not see any information, such as user attributes, which have been populated by value add brokers (see below) as part of the exchange transaction. The advertising exchange carries enough information to allow for advertisers to setup self-optimizing campaigns based only on landing URLs, creatives, and campaign goals. Similarly, algorithms can be run on advertiser landing URLs to choose possible subsets of value to be added to the exchange as well as relevant topics (keywords, categories, and content pages). The available features can then be selected to maximize the campaign goals, for example branding campaigns would minimize the amount paid per impression and maximize the coverage and inventory quality. A sales campaign on the other hand would be selected to track conversions and maximize the number of high value conversions for the existing advertiser budget.

Architecture 200 may also comprise value add broker 210. For purposes of explanation only, only one value add broker will be discussed herein. However, embodiments of the present invention are not limited to a single value add broker, as any number of value add brokers may exist. In an embodiment, value add broker 210 is an aggregator of user data providers. A user data provider is any entity that maintains any partial information that can be referred back to an individual user (such as one of users 214, discussed below) for advertising purposes. For example, user data may comprise demographic, psychographic, and behavioral information. More specifically, for example, user data may comprise age, gender, wealth index, interests, shopping habits, etc. However, embodiments of the present invention are not limited to any specific type of user data. In an embodiment, value add broker 210 is any large user data aggregator, such as PayPal, Visa, Yahoo!, Verizon, as well as an aggregate of smaller user data providers. Any online store that collects user data can function as value add broker 210 by providing user location level and user purchase pattern level information. This information can be aggregated with demographic profiles from small web email providers to form more comprehensive user descriptions.

For a non-limiting example, one type of information that may add value to an advertising transaction in accordance with the invention is the identification of user attributes of a publisher's audience. Yet, user attribute information is stored in practically limitless different ways and formats, and according to a great variety of hierarchical classes and categorizations. Thus, the value that is added may include "gender," "age," "location" and "income," which are good candidates for the common user attribute space within the exchange because all publishers generally keep track of these kinds of demographic categories. Accordingly, as long as there is a mapping function between value space of the value add brokers 210 and a common value add space, the common value add space can be any predetermined mathematical model or set of categories and may be represented at any level(s) of granularity.

In an embodiment, value add broker 210 enriches information regarding a user viewing one of publishers 202's web pages. Value add broker 210 does not necessarily disclose any personally identifiable information about the source of the value. In an embodiment, value add broker 210 can accomplish this by performing a private ID lookup and passing back a set of aggregate value attributes that could be consumed by advertisers 206 and advertiser broker 208. This value enrichment increases the value of the display of the ad to advertisers 206, helps produce more relevant ads to consumers, and creates a more complete picture of the user for ad serving purposes without violating the user's privacy. The aggregation across different providers serves two independent roles, in an embodiment: (1) it creates a comprehensive view of the third party knowledge landscape, and (2) it thickens the data sources to allow for anonymization and preservation of user privacy.

In this regard, any representation of value as understood by a value add broker 210 may be translated to the common value set represented within the exchange in accordance with the invention, and thus, various embodiments of the invention contemplate the enrichment of exchange transactions with information from a value add broker 210 as normalized to the common value space utilized within the exchange in accordance with the invention.

In an embodiment, value add broker 210 receives direct payment for even small and/or partial value added. By participating in architecture 200, value add broker 210: (1) is paid for its information, (2) can enrich its own information (even redundant data providers are useful for scoring purposes), and (3) can verify its information (providers with poor quality of data will gain insight and will be able to actively address data quality issues). In an embodiment, value add broker 210 receives a request from publisher broker 204 proxied by exchange 212 (explained in greater detail below). Value add broker 210 appends known missing value, such as known user attributes, into this request for the consumption of advertiser broker 208. Value add broker 210 does not know the page that the user is on from publisher broker 204, and value add broker 210 need not pass any user identifiers to advertiser broker 208.

In a non-limiting embodiment, value add broker 210 comprises a value recorder to record value into the exchange and a value delivery system to respond to requests for value. In an embodiment, the user data recorder informs the exchange that the value add broker knows something about information that facilitates a transaction, through whatever means that may be. To do this, when the value add broker 210 gains value about something of interest to transactions in the exchange, the value add broker can take automatic action to add the value to the exchange. In an embodiment, the information passed to the exchange is signed in a manner that proves the identity of the value add broker to the exchange. In an embodiment, the exchange, upon verifying the identity of the value add broker, will set a cookie to the user's browser with the name of the cookie identifying the value add broker, and the cookie value being the information provided. When the exchange receives an ad request from a user (the user having been sent to the exchange from a publisher broker), if there is any value that the publisher is willing to pay an additional amount for, then the cookies for all value add brokers are read from the user's browser. For each value add broker identified by a cookie, if the value add broker is currently live, the exchange will send a request to that value add broker with the cookie value and any unknown value which the publisher is willing to pay to have provided. The value add broker then responds back, including the information for as much of the value as they can provide, along with the price they are asking for in exchange for its use in one or more transactions.

In an embodiment, value add brokers 210 can participate in an advertiser auction and get paid directly through an advertiser bid with no value add requests from the publisher broker. This would be considered a "publisher blind" value delivery. If an advertisement bid meets and exceeds a publisher requested minimum, then the bid remainder left after publisher ask can be used to acquire missing value and maximize advertiser ROI (return on investment) using tighter targeting. The exchange provides a call back to the winning value add broker(s) letting them know what value, or portions of value, they won and what amount they will be paid for that value.

For the avoidance of doubt, exemplary embodiments herein describe a value add broker in the context of advertisers benefiting from value input by the value add broker, however, as noted earlier, publishers may also benefit from value provided to the exchange in connection with transactions. For instance, a publisher may wish to express its goals in the exchange as a function of a specific user, or demographic target. For example, a publisher might want all the advertisements to be "age appropriate" for the users of the publisher's site. A value add broker could thus bridge that gap by providing valuable information about the users of the publisher's site to the exchange for use in transactions.

Given that publishers and advertisers can apply payments directly to value add brokers for specific information, in an embodiment, there is a verification and rating process for value add brokers. Multiple value add brokers will be competing for the same service. In an embodiment, where the value is information provided in the form of data, competition is performed based on ask, but also based on quality of data. Advertisers will have transparency into the publisher broker network, and similar transparency can be offered into the value add broker network by offering a rating system. Value add broker ratings can be calculated dynamically through the use of overlapping collection symbols. Overlapping data could be used to calculate ground truth predictions as well as verify the data provided by individual value add brokers. This information in turn could be used to automatically rate value add brokers. In an embodiment, a simple voting system can be used to verify the accuracy of any specific collection symbols for each broker, or the quality of the broker as a whole. The maintainers of the exchange would be responsible for publishing the voting consensus to the public, or to disbar the broker completely.

In an embodiment, no value add broker will be able to provide value data across the entire universe of value that can be added. However, it might be possible to generate data that represents that universe by creating data functions based on different value add providers and choosing the consensus opinion for each value element stored and normalized within the exchange. Publishers and advertisers could choose to use the consensus opinion or any individual value add broker's collection data. In an embodiment, data units of "statistically significant" value are created.

One example of a value add broker is an audience data broker that acquires data about users. In this regard, most value add brokers often run into privacy issues not due to the data they have, but due to the data they don't know. For instance, holes in a user profile could be significant or unique enough to be carrying sufficient information to reconstruct a unique user. Filling-in these holes using data from other user data providers could allow those providers to generate statistically significant aggregates that can be used for research purposes without sacrificing user privacy. Thus, value can be selectively aggregated by sampling across different value add brokers 210 in accordance with the invention.

In one embodiment of the invention, value add broker 210 can aggregate information about publishing trends with respect to the efficacy of certain value elements used across a variety of publishers. Armed with this information about aggregate trends concerning the efficacy of certain display characteristics, and coupled with the ability to normalize value data to a common vocabulary understood by all of the exchange participants, advertisers can be more effective in the marketplace.

Architecture 200 also comprises exchange 212. Exchange 212 acts as a mediator among publisher broker 204, advertiser broker 208, and value add broker 210. Exchange 212 is the framework that allows publisher broker 204 to have its ads enriched with value by value add broker 210. In an embodiment, exchange 212 routes traffic and facilitates transactions, e.g., auctions, between publisher broker 204, advertiser broker 208, and value add broker 210. In an embodiment, exchange 212 is a server or a set of servers. Exchange 212 creates a system in which value add broker 210 can monetize its data and in which advertiser broker 208 can achieve more tailored objectives in the exchange with desired level of expected result, e.g., reach a larger audience of more highly targetable traffic. In an embodiment, exchange 212 provides minimum standards of conformity, ensuring that some base information about the request is provided to be used by advertiser broker 208, regardless of value add data from publisher broker 204 and value add broker 210.

To provide minimum standards of conformity, in an embodiment, exchange 212 provides collection symbols related to the category of the publisher's page, the meaningful keywords in it, as well as geo-location information extracted from the user's IP address. The base data, such as the user IP address, the URL of the publisher's page, and any other such information deemed relevant should also be provided to each advertiser broker so that the advertiser broker may attempt to extract additional information to provide value-added services to the advertisers they service. In an embodiment, exchange 212 sends all publisher broker requests that match a set of criteria defined by the advertiser broker, along with all relevant data about the request (e.g., the ask and collection symbols provided by the publisher, value add broker, and the exchange itself). In an embodiment, if the advertiser broker has any ads that it would like to have displayed and that meet the ask, it returns those ads, up to the number of ads requested, along with a CPI (cost per impression) bid on each. However, embodiments are not limited to CPI pricing, as other pricing models may be used, e.g., CPC (cost per click), CPA (cost per acquisition), CPM (cost per thousand impressions), and revenue sharing, which can all be normalized to a common pricing model for comparison across different advertising networks. Exchange 212 provides a call back to the winning advertiser broker(s) telling it which ads were displayed, and at what prices.

Architecture 200 also comprises users 214. For purposes of explanation only, only one user will be discussed herein. However, embodiments of the present invention are not limited to a single user, as any number of users may exist. Users 214 request a webpage from publishers 202. The webpage comprises content and advertisement space, which is filled with advertisement(s) from advertisers 206. Knowledge about users 214 is an example of information that can be provided to the exchange by a value add broker 210 that enriches the marketplace.

Using architecture 200, value can be provided to advertisers 206 in a variety of ways include by enriching the publishing property with customer intelligence or by acquiring the data directly from value add broker 210 on the basis of a licensing fee. Advertiser broker 208 can choose to pay an estimated monthly per volume amount for each attribute that their advertisers are interested in targeting. This transaction could be done off-line but would need to be registered with exchange 212 to facilitate data rerouting at request time. Advertiser broker 208 can base its bids on any targeted value provided by value add broker 210. For example, advertisers 206 may place base bids either on a CPC or CPM basis and have the option to incrementally bid for any value exposed to them. Advertiser broker 208 is free to pay higher rates for redundancy (to be extra sure about the value being provided) or higher data quality. Advertiser broker 208 may manage the risk surrounding assessing individual advertiser performance and converting all bid types to CPI for final ranking by exchange 212. In an embodiment, the pricing model is similar to the pricing models discussed above.

In an embodiment, when publishers 202 have an impression that they are willing to sell (with an optional ask), they can provide a URL and any targetable values to exchange 212. Exchange 212 passes this data and possible additional user data from value add broker 210 to advertiser broker 208. In an embodiment, advertiser broker 208 ranks the bids of advertisers 206 using any proprietary attributes or techniques that it finds useful. For example, advertiser broker 208 could choose to run keyword extraction or categorization and use this for targeting certain types of users. Advertiser broker 208 would output a CPI ranked list of advertisers (in an embodiment, the number would be equal to the number of ads requested by the publisher), where the CPI value would already be stripped of any costs used for purchasing the value. In an embodiment, where multiple advertiser brokers exist, exchange 212 then ranks all ads across all advertiser brokers and chooses the best one (as measured by CPI). If these ads meet or exceed the publisher ask, then exchange 212 proxies a display of the ads on the publisher website.

A second-price auction can still be applied to facilitate aggressive bidding. Publishers 202 can get paid on a CPI basis. Ad impressions are logged to be used for traffic volume calculations used for licensing the value provided by the value add brokers 210. In an embodiment, exchange 212 may be used to gate user information originating from publishers 202. Publishers 202 can choose to enrich their property with value provided by value add brokers 210 and share this information only with selected advertiser brokers.

To facilitate participants of all types to become part of architecture 200, it may be desirable to establish a pricing model that is extremely flexible, yet at the same time does not change the industry paradigm so greatly as to create confusion that would prevent potential participants from joining architecture 200. Advertisers are already accustomed to both CPC and CPM pricing, with a small but increasing market for CPA (cost per acquisition) pricing. Publishers tend to prefer CPM pricing, and the larger, more complex publishers sell traffic broken down by user demographics and in other ways. Smaller publishers generally have to accept what they can get, which often results in CPC or CPA pricing. As mentioned in the background, owners of value, such as value add brokers 210, have not typically been able to capitalize on their data, and when they have, have done so in flat transactions for aggregate data, e.g., selling an entire customer database.

To support the flexibility of all of these pricing models, and even to allow for others in the future, in an embodiment, exchange 212 is based on a single model between publisher broker 204 and advertiser broker 208, where, on each request, publisher broker 204 will set a minimum ask, i.e., reserve price, for their available ad space, and advertiser broker 208 will place a bid on the right to have their ads displayed on this request. As discussed above, embodiments are not limited to CPI pricing, but CPI pricing is an example of a common pricing model that can be used. In one embodiment, exchange 212 takes a fractional portion of the revenue flowing through it to support its operations, which can either be implemented via incrementing the publisher ask by some percentage, or by making agreements with publishers 202 that some percentage of the revenue generated from their traffic will be held back.

Because publishers 202 are concerned with user satisfaction, they would prefer to have some control over the relevancy of the ads placed on their site. Click-through rate is considered a good measure of relevance and therefore many publishers might want minimum click-through guarantees on the ads. Exchange 212 allows publishers 202 to optionally specify a minimum click-through rate that is acceptable. Exchange 212 monitors advertiser broker 208 to make sure that if it wins these types of asks, then it is meeting the performance guarantees. In an embodiment, if an advertiser broker consistently provides low click-through rates for publisher asks that require a minimum, exchange 212 may take punitive measures such as suspension from the system. Value add brokers 210 can be useful in such situation by identifying bad performers.

Advertiser broker 208 is responsible for converting any externally facing pricing models it allows into the CPI bid on each request. For example, a simple CPC to CPI conversion would be to multiply the per click bid of each ad by the expected click through rate of the ad for the conditions present. Similarly, to convert a CPA bid to CPI, advertiser broker 208 could multiply the conversion rate by the per conversion bid of the advertiser. The more information or value specified in each request, the better job advertiser broker 208 can potentially do in predicting the probability of a click or a conversion. Since it is expected that advertiser broker 208 will therefore desire additional information along with each request to help it predict what those probabilities are, as well as to allow the advertiser to express a preference for various value provided by value add broker 210 by bidding differently, they will want to have information from value add broker 210 at request time. The pricing model between value add broker 210 and advertiser broker 208 will be a market, where value add broker 210 sets minimum guarantee asks, as well as CPM pricing rates. In an embodiment, advertiser broker 208, if it wishes to use value add broker 210's information or services, will agree to pay the greater of the guarantee amount or the CPM rate for the number of ad impression auctions that it wins. Exchange 212 is necessary to this transaction so as to track the number of ad impression auctions advertiser broker 208 wins, as well as to query for an attach value add broker 210's valuable information to the request sent to advertiser broker 208.

The entity hosting exchange 212 has access to all data sources, giving it the power to make partial decisions. To alleviate the concern that exchange 212 will not be impartial both as hosting body and as a direct participant, in an embodiment, transparency will be built into exchange 212. In that embodiment, exchange 212 does not have a way to identify brokers of any kind. Advertiser auction algorithms and advertiser to publisher and value add broker matching algorithms are standardized and transparent to all exchange participants.

In an embodiment where value is user information, no user identifiable information is sent to advertisers 206 until the user performs an action. Exchange 212 passes advertiser broker 208 only the attribute values. Advertisers 206 do not see the user identifier. At click-time, however, it is still possible for an advertiser to establish a user identifier and associate the bidding profile with that user. By participating in architecture 200, value add broker 210 is explicitly sharing its information with advertiser broker 208. Although some leakage is inevitable whenever targeting is permitted (e.g., if a user is targeted and clicks on an ad, the advertiser can correlate and store the targeting attributes for that user), providing audience data from every ask to advertiser broker 208 for bidding purposes exacerbates the problem. However, this can be addressed by centralizing the auction system at the exchange level by requiring that advertiser broker 208 specifies a value function that is evaluated for each ask on exchange 212. For example, exchange 212 could require a linear value function, and advertisers 206 would specify a base bid and a bid increment for each attribute value. Exchange 212 would control the instantiation of the audience data, thus not leaking any to advertiser broker 208.

In one example, advertiser Expedia has an ad for "cheap vacations in Bali." Expedia chooses the keyword "Bali vacations" to start a bidding process. Business intelligence may be uninformed or unsure about the best way to target vacation ads. A value add broker 210 thus has the opportunity to inform about vacation ads generally, and to take the value add another step by providing specific information identifying users who have a history of purchasing vacations, users who recently have purchased books on vacations and users who perform searches related to travel. Expedia decides to pay for this business intelligence from value add broker 210, and Expedia decides to license specific user information from user conglomerates Amazon, MSNSearch, and Orbitz. Expedia agrees to pay value add broker 210 a flat fee for the value provided in leading Expedia to the best group of customers. Similarly, Expedia agrees to pay Amazon 1 cent for using their user information for each ad impression, 1 cent to MSNSearch and 3 cents to Orbitz. In this example, Amazon, MSNSearch and Orbitz are in effect a second layer of value add brokers 210 showing that a variety of third parties' value may have to be gained prior to its being useful Continuing the example, as part of the online auction process, for the "cheap Bali vacations" ad, Expedia creates a targeting profile for users who: "bought a book on Bali in the last month," "Have traveled to a tropical location in the last two years," "Have household income between $30,000 and $60,000," "Have been searching for vacation deals," and "Have ever clicked on ads." Expedia places a 20 cent base bid. To express their bidding preference, they also place a 5 cent incremental bid for the first attribute, a 10 cent incremental bid for the second attribute, a 2 cent incremental bid for the third attribute, 1 cent incremental bid for the fourth attribute, and a 2 cent incremental bid for the fifth attribute to express their bidding preference. Additionally, exchange 212 will log all views where user data was used to enrich targeting and help value add broker 210 enforce the licensing fees. Borders as a publisher has a user requesting the page on the "Lonely Planet Guide to Indonesia" and they would like to show ads on that page. They call exchange 212 with the page URL and information about the user: "Bought four travel books in the last month," "Bought a book on Bali in the last month," and "Has clicked on ads before."

Given the URL, exchange 212 extracts keywords ("Bali vacations," "Indonesia travel," "exotic vacations," "beach vacations"), categories ("travel," "vacations") and proxied user data information (coming from the licenses with value add broker 210), and sends this information to each advertiser broker. Each advertiser runs an auction for the impression. The advertiser broker can choose to ask for aggregate bids from advertisers and subtract the value add broker licensing fees at the time of the impression. For example, Expedia might place an aggregate bid of 24 cents, and after subtracting the licensing fees, their base bid would be equal to 20 cents. Expedia's advertiser broker needs first to subtract all incremental bids and to assign credit to the publisher or value add broker as appropriate. For example, Expedia's 5 cent incremental bid for "bought a book on Bali in the last month" and their 2 cent incremental bid for "Have ever clicked on ads" will be assigned to the publisher. The value for "Have traveled to a tropical location in the last two years" attribute is provided by Orbitz so the 10 cent incremental bit would be assigned to them. Neither the publisher, nor the value add brokers were able to assess the household income of the user so this incremental bid is not used. The 1 cent incremental bid for the search user patterns will be credited to MSNSearch. After the appropriate credit distribution the advertiser broker would assign a publisher value bid (the base bid+any incremental publisher bids) to each advertiser. In case of Expedia publisher value bid would be equal to 27 cents. Given that Expedia's bid is CPC based, the advertiser broker needs to convert it to a CPI one before running an auction and selecting the best ads to send to the exchange. Expedia's advertiser broker knows that this specific ad is likely to get a 10% CTR, and thus for ranking purposes, Expedia is assigned a 2.7 cent CPI bid. If Expedia wins within its advertiser broker, its ad will be sent for global ranking to the exchange. If Expedia wins the global auction then their advertiser broker is charged 2.7 cents for displaying the Expedia ad. Expedia's ad gets served on Border's page. The user clicks on the ad. The user buys a two-week vacation to Bali.

The above-described example is an illustration of a specific kind of value add broker 210, referred to herein as an audience data broker 210a, or audience broker, who provides value by knowing something about a prospective audience that is of interest to advertising or publishing entities participating in transactions for advertising on-line. However, as will become evident below, additional kinds of value add broker entities 210a through 210n are contemplated in accordance with the invention, and entities may behave as multiple add broker entities 210a to 210n of different types, combining different types of value add services in order to be most effective in providing value to exchange 212.

Figure 3:
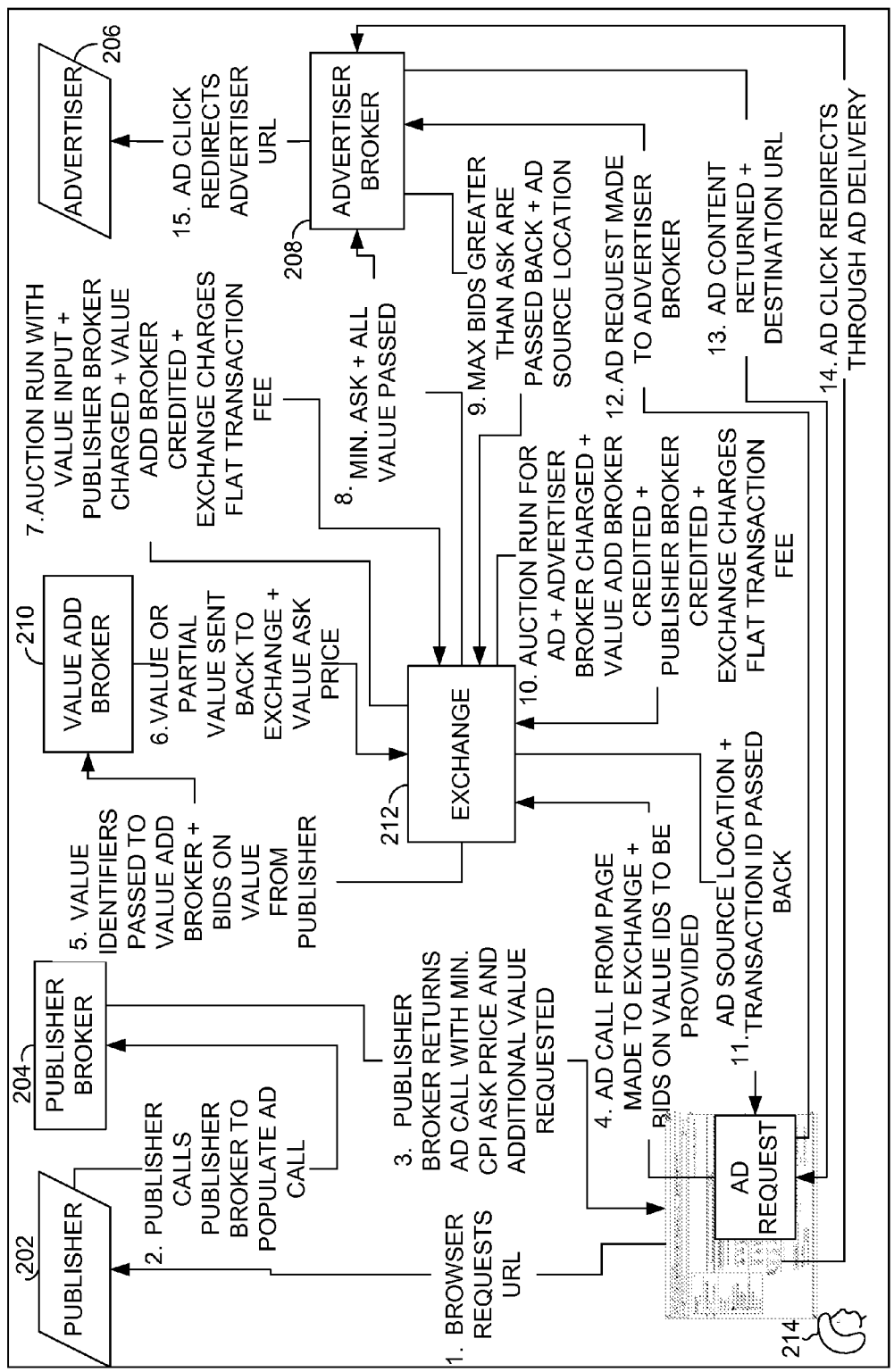
FIG. 3 illustrates one example of the flow of data within a federated advertising exchange architecture according to embodiments of the present invention.

FIG. 3 illustrates one example of the flow of data within architecture 200, according to embodiments of the present invention. Referring to FIG. 3, user 214 opens a browser and requests a URL of a webpage from publisher 202 (1). In an embodiment, the webpage has some advertisement space available, which publisher 202 desires to sell to an advertiser. Publisher 202 calls publisher broker 204 to populate the ad call (2). Publisher broker 204 returns the ad call with a minimum CPI ask price and value requested (as discussed in greater detail above) (3). The ad call is made to exchange 212 along with bids on value and value element identifier(s) (4). Exchange 212 passes the value element identifier(s) and the bids on value to value add broker 210 (5). Value add broker 210 looks up the value identifier(s) and responds with the corresponding information or services along with an attribute ask price (6). In an embodiment, exchange 212 runs an auction for the information or services, charges publisher broker 204, credits value add broker 210, and holds back a flat transaction fee (7). Exchange 212 passes a minimum ask plus all value possessed to advertiser broker 208 (8). Advertiser broker 208 responds with all of the bids that are greater than the ask, along with the ad source location (9). In an embodiment, exchange 212 runs an auction for the ad, charges advertiser broker 208, credits value add broker 210 and publisher broker 204, and holds back a flat transaction fee (10). Exchange 212 passes the ad source location and transaction identifier back (11). An ad request is made to advertiser broker 208 (12), which responds with the ad content and a destination URL (13). If user 214 clicks on the ad, the user is redirected by advertiser broker 208 (14) to advertiser 206 (15).

The above example illustrates just one embodiment of the present invention. Other embodiments may not involve the same operations or conduct them in the same order. Specifically, the contexts in which a value add broker 210 can provide value to an exchange 212 in accordance with the invention are practically limitless, i.e., anytime an advertising entity or publishing entity participating in an exchange 212 may benefit from external action or information, a value add broker 210 has an opportunity to make that benefit happen by providing the corresponding value. Also, other examples may not rely on auctions to set prices, instead relying on a firm ask that can be accepted or declined.

Figure 4:
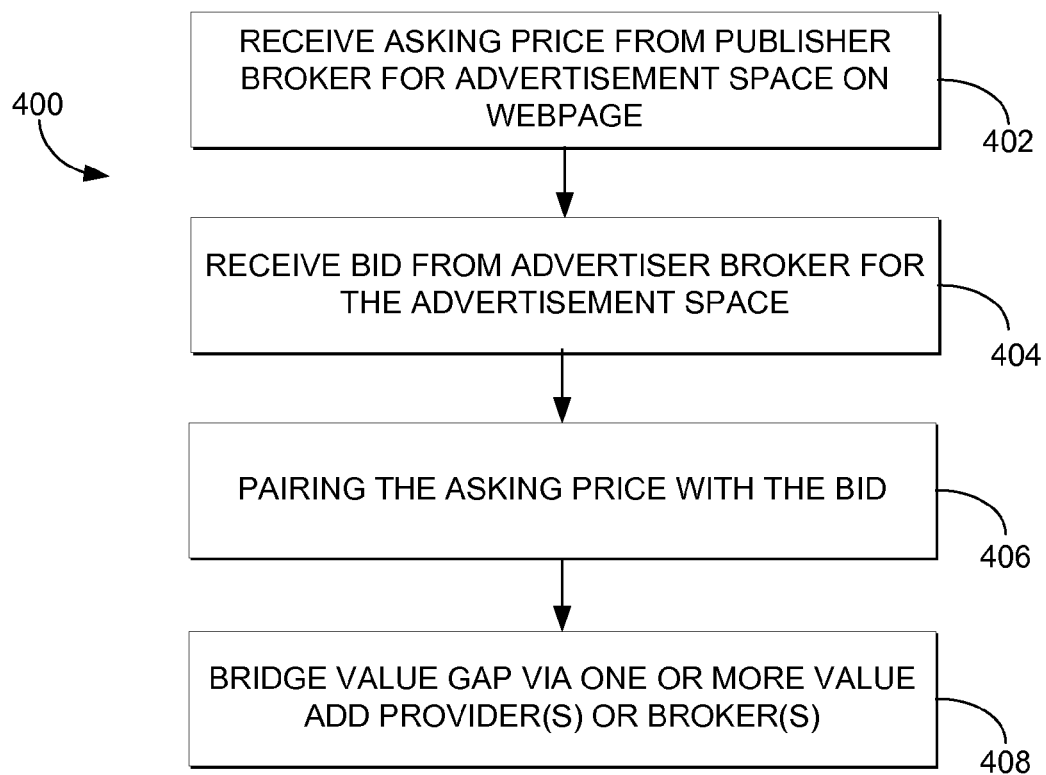
FIG. 4 illustrates a flowchart of the operation of an exchange according to embodiments of the present invention.

FIG. 4 illustrates a flowchart of the operation of an exchange, according to embodiments of the present invention. Referring to FIG. 4, method 400 begins with the receipt of an ask from a publisher broker for advertisement space on a webpage (402). A bid is received from an advertiser broker for the advertisement space (404). In an embodiment, bids are received from many different advertiser brokers. The ask is paired with one of the bids (406) and the advertisement space on the webpage is awarded to the winning bidder. As discussed in greater detail above, other information such as valuable information from a value add broker may be attached to the ask (408), and quality of the bidding advertisers may be examined prior to the advertisement space being awarded.

Figure 5:
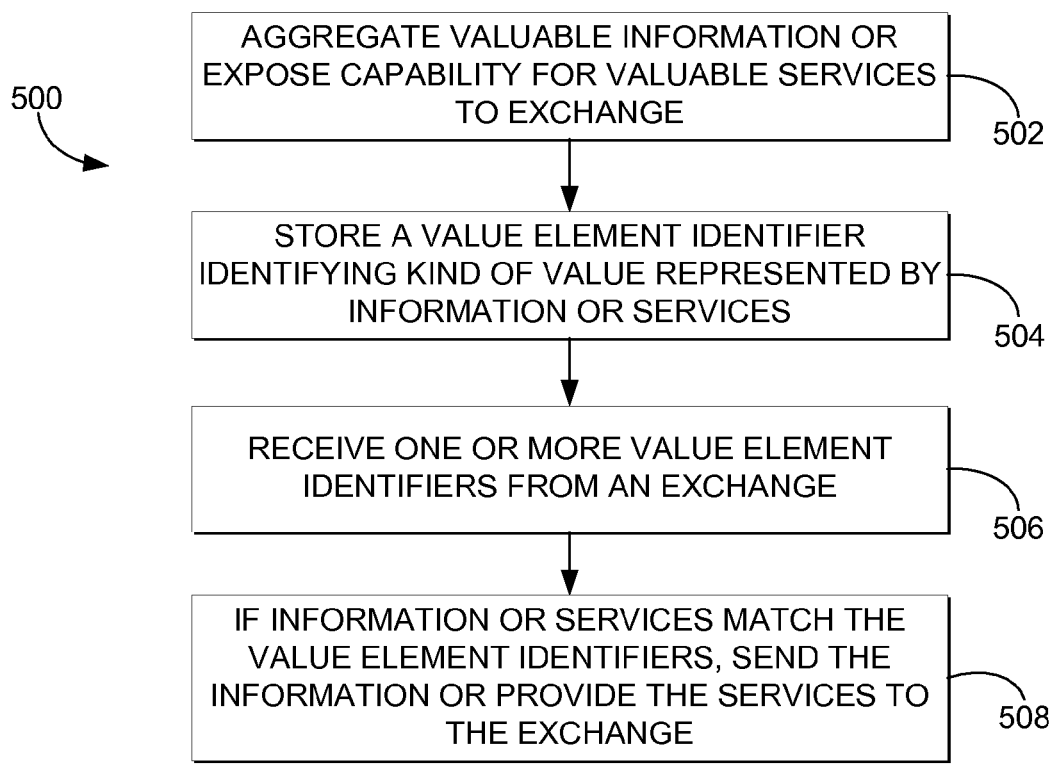
FIG. 5 illustrates a flowchart of the operation of a value add broker according to embodiments of the present invention.

FIG. 5 illustrates a flowchart of the operation of a value add broker, according to embodiments of the present invention. Referring to FIG. 5, method 500 begins with the aggregation of valuable information or the identification of valuable services that can be provided (502). The aggregate valuable information or valuable service(s) is stored according to value identifier(s) identifying the kind of value provided by the value add broker to the exchange (504). Then, when one or more value identifier(s) are published by the exchange and received by the value add brokers, the value add brokers have an opportunity to determine if they can fulfill the value request. If so, the aggregate valuable information corresponding to that value identifier is sent to the exchange, or the valuable service is performed in connection with one or more exchange transactions (508). In a non-limiting embodiment, the value add broker may set a cookie on the user computer to identify itself as having valuable information about that user. When the exchange reads that cookie, it knows which value add brokers to query for information about the user.

Accordingly, in non-limiting embodiments, the invention includes a system to facilitate trading of advertising by having a publisher broker to represent publisher(s) that determines an ask for an advertisement space on the publisher(s)' webpages. An advertiser broker also represents advertiser(s) and manages an advertiser(s)' bid for the advertisement space. The exchange of the invention then facilitates transactions for advertisement space between the publisher broker and the advertiser broker by soliciting valuable information or services from one or more value add brokers communicatively coupled to the exchange via one or more networks. The exchange may itself comprise internal value add brokers that mine internal data represented across disparate advertising networks, and which identify trends, synergies, user blocks, etc. which can be of value to participants in the exchange.

Figure 6:
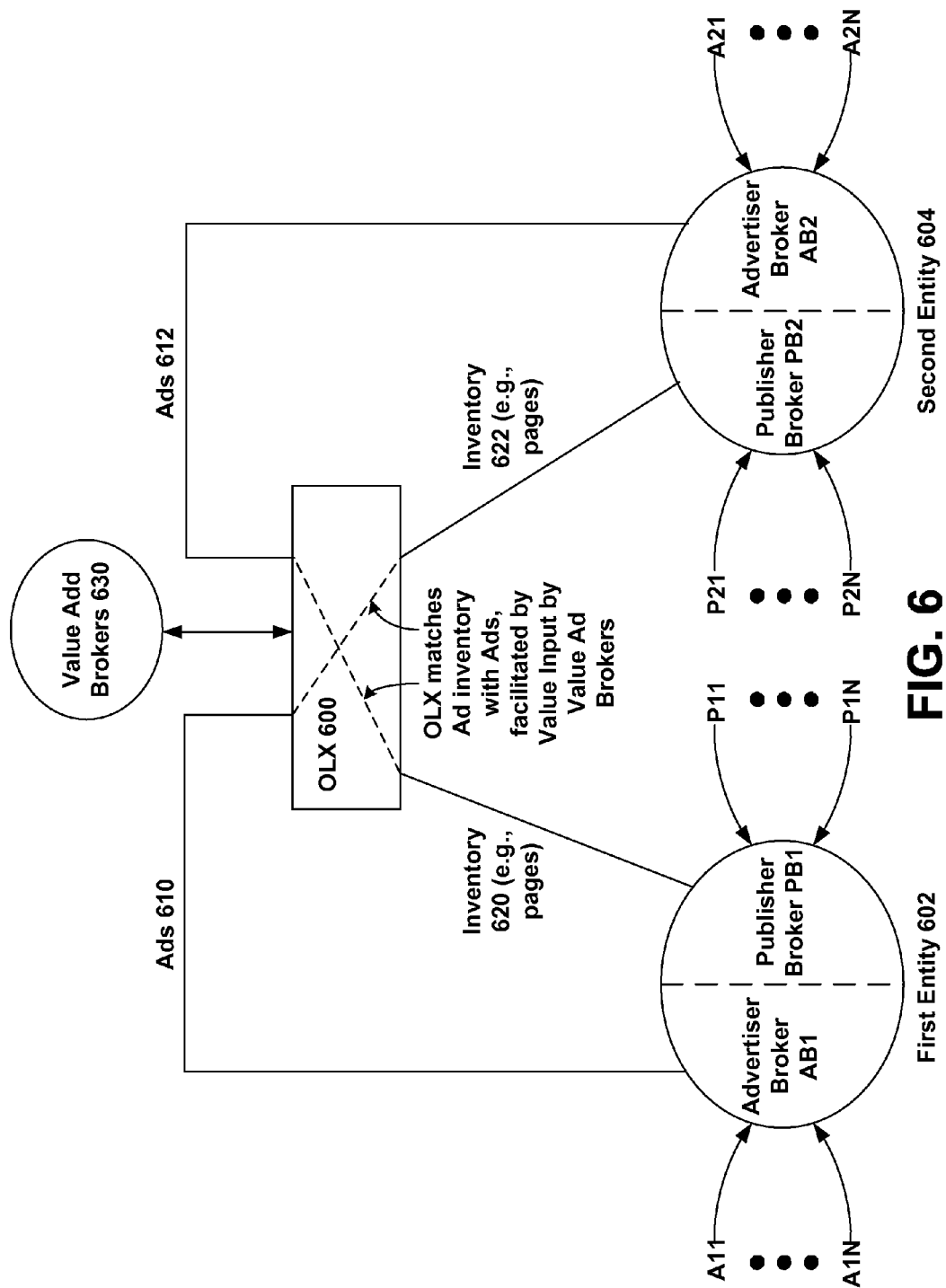
FIG. 6 is an exemplary non-limiting block diagram of embodiments of an online advertising exchange including value add brokers in accordance with the invention.

The invention thus enables broad liquidity over distributed advertising markets, such as the above-described advertising exchange systems. FIG. 6 illustrates a conceptual block diagram of a federated on-line advertising exchange 600 provided in accordance with the invention. As shown, a first entity 602 and a second entity 604 are subscribers to the services of exchange 600. First entity 602 may have an advertiser broker AB1 for brokering advertisements 610 from a variety of sources A11 thru A1N and a publisher broker PB1 for brokering inventory 620 from a variety of publishers P11 thru P1N. A goal of ad broker AB1 is to find inventory for existing advertisements. A goal of publisher broker PB1 is to represent publishers, i.e., to help obtain revenue for their inventory (e.g., pages). Similarly, second entity 604 may have an advertiser broker AB2 for brokering advertisements 612 from a variety of sources A21 thru A2N and a publisher broker PB2 for brokering inventory 622 from a variety of publishers P21 thru P2N.

In accordance with the invention, by providing ads 610 and 612 to OLX 600 according to a first communications layer, and by providing inventory 620 and 622 to OLX 600 according to an independent communications layer, OLX 600 can efficiently match advertisements to available inventory with greater simultaneous knowledge of multiple advertising networks. For instance, first entity 602 might be Microsoft's MSN Web site, and second entity 604 might be Yahoo's portal Web site, joining two powerful advertising and publishing bases for greater shared insight. When additional publishing entities and advertising entities join, it is advantageous that the power of a federated exchange grows or scales relative to the closed, proprietary advertising models in proportion to the diversity of representation of marketplace data. Similarly, value added to the exchange 600 by value add brokers 630, as described above, also scales with the diversity of value added by different value add brokers 630. With more valuable perspectives offered by the information and services offered by value add brokers 630 comes a more representative view of the entire value pool across the entire population, creating a highly efficient marketplace in which advertising transactions are facilitated by value added by third parties.

Figure 7:
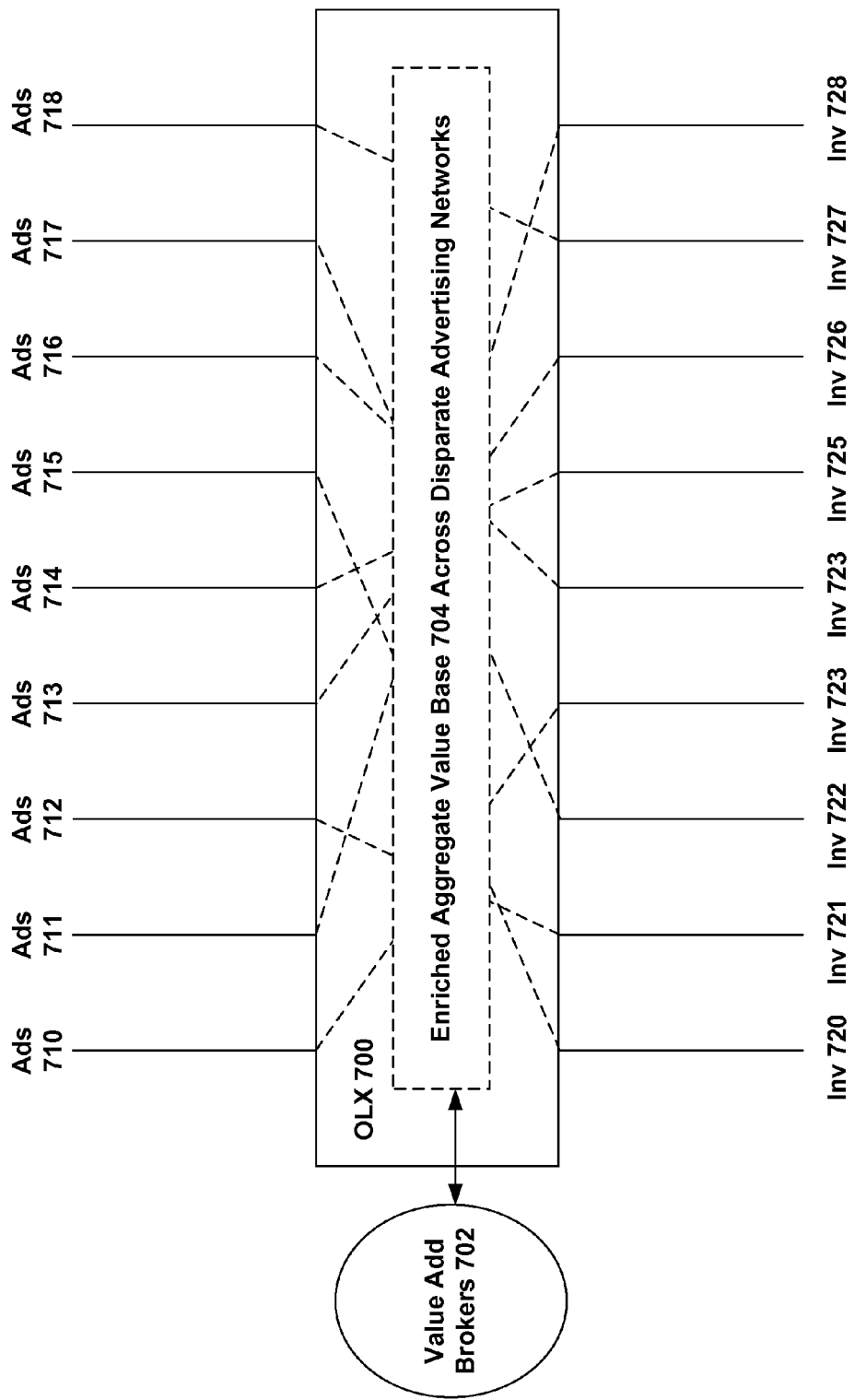
FIG. 7 is another exemplary non-limiting block diagram of embodiments of an online advertising exchange including value add brokers in accordance with the invention.

For simplicity, FIG. 6 illustrates only two entities, but advantageously, the invention can also be scaled to accommodate any number of advertising networks, e.g., eBay, Amazon, Google, etc. This is illustrated in FIG. 7 showing an OLX 700 that accommodates a wide range of advertising 710, 711, 712, 713, 714, 715, 716, 717, 718, etc. from a wide range of parties, and also accommodates a wide range of inventory 720, 721, 722, 723, 724, 725, 726, 727, 728, etc. from a wide range of parties. OLX 700 then makes the best assessment of how to match advertising content with inventory according to a variety of policies (e.g., maximizing ad revenue, maximizing quality of advertising, maximizing conversion rate, etc.). In accordance with embodiments of the invention, OLX 700 then makes the best assessment of how to match advertising content with inventory according to a variety of policies having to do with value requested for a given advertising medium.

An opportunity is then created for various value add brokers 702 to populate value aggregation layer 704 of exchange 700 for normalized use in transactions. Thus far, that value has been described generically in terms of information, such as audience information, or services, such as financial services, that are valuable to or may otherwise facilitate the completion of a transaction in the exchange. The different types of value add brokers 630 that may pertain alone or in combination are thus described in more detail below. While various non-limiting embodiments of the invention are described in the context of two parties herein, this is for ease of conceptual presentation and it can be appreciated that the invention can be provided for any arbitrary number of advertising entities, publishing entities and value add brokers wishing to join the exchange 700.

Having thus introduced the notion of value add brokers and described various exemplary advertising exchange environments, various non-limiting embodiments of the value add broker for adding value to an advertising exchange or advertising framework in accordance with the invention are now presented in more detail below.

Value Add Brokers for Federated Advertising Exchange

As mentioned, the invention enables each participant to a multi-party advertising exchange to request/receive value from value add providers, via one or more value add brokers, which facilitates the completion of transaction(s) in the exchange. The representations of value provided by third party value add brokers are normalized to a common vocabulary for describing the value within the exchange.

Figure 8:
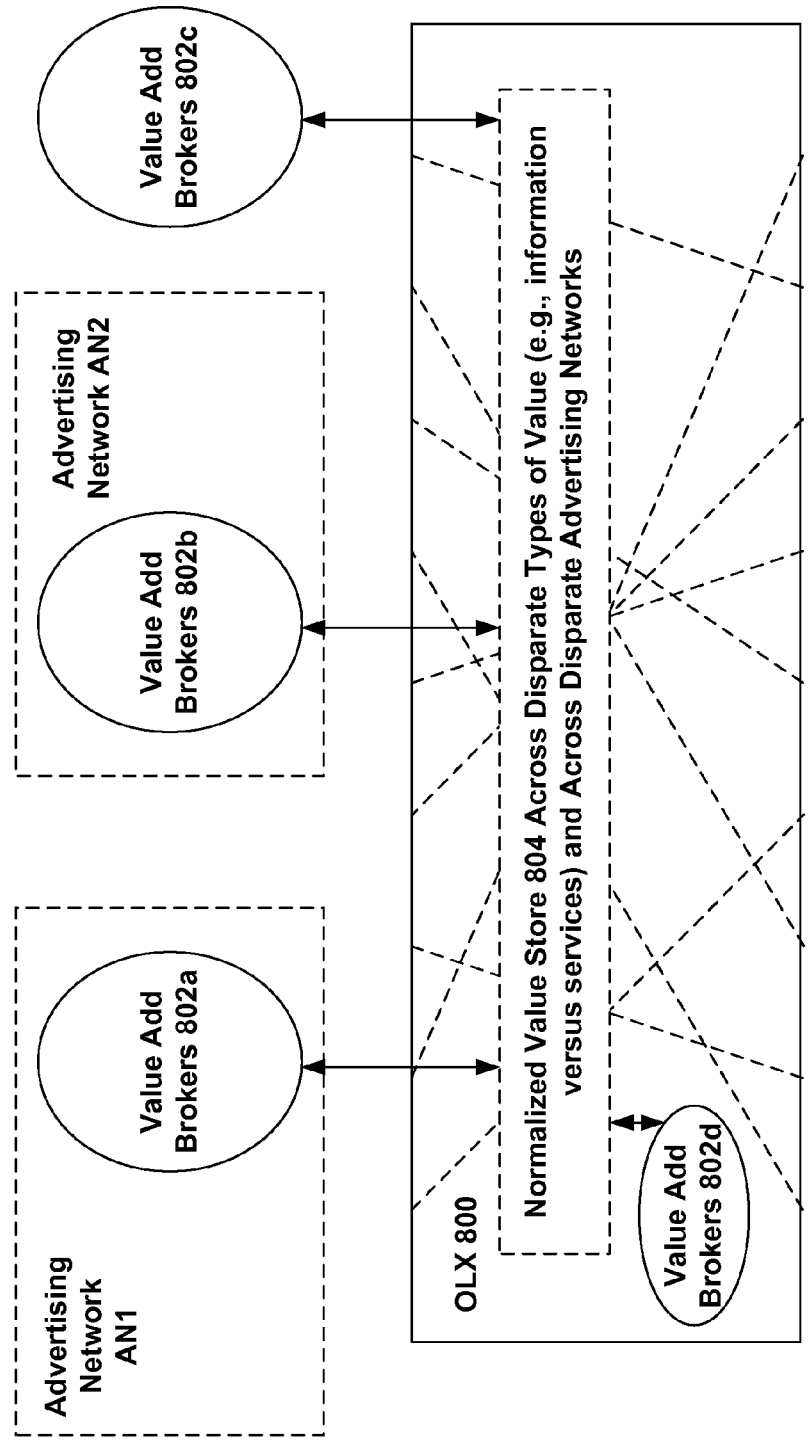
FIG. 8 is another exemplary non-limiting block diagram of embodiments of an online advertising exchange including value add brokers in accordance with the invention.

As shown generally in FIG. 8, the invention provides an infrastructure 804 for normalizing expressions of value within an advertising exchange 800 that federates advertising entities across disparate advertising networks AN1, AN2, etc. In this regard, value add brokers 802a, 802b, 802c, which may be from disparate advertising networks or independent providers, form a network of extra value from which participants in the exchange 800 can derive value. Such extra value can be in the form of extra information which helps to facilitate a transaction, e.g., reduce uncertainty around the results of the transaction, or in the form of the performance of services, which if performed, benefit one of the participants to the transaction. For instance, a participant may not wish to enter a transaction without insurance, and thus without an insurance provider. As shown in FIG. 8, value add brokers 802d can operate internally to the exchange 800 as well.

Figure 9:
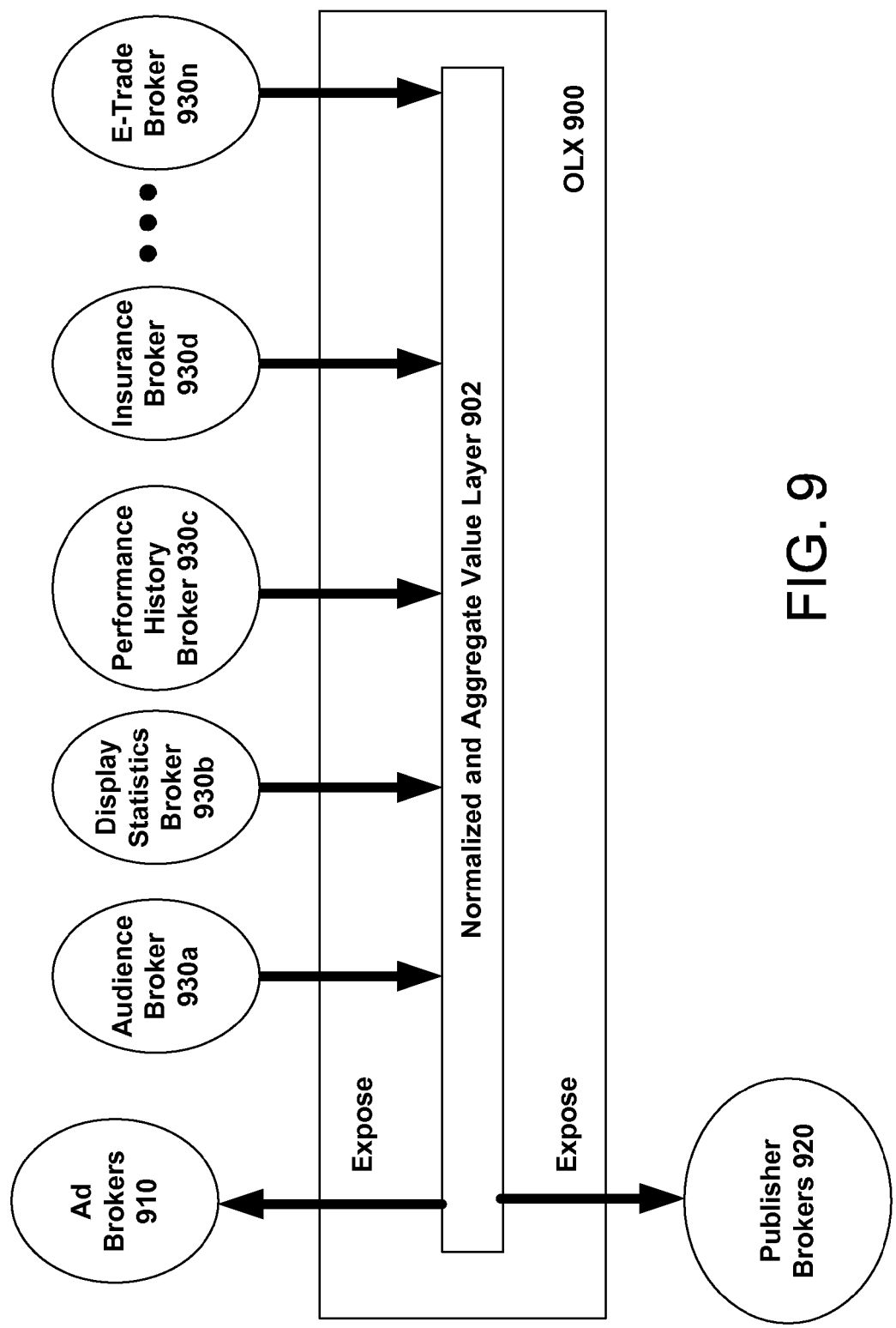
FIG. 9 is still another exemplary non-limiting block diagram of embodiments of an online advertising exchange including sample value add brokers in accordance with the invention.

FIG. 9 shows a sampling of different value add brokers 930a, 930b, 930c, 930d, . . . , 930n that may interface with layer 902 for normalizing and aggregating value in accordance with an exchange 900 of the invention, in order to expose such value to advertising entities 910 and publishing entities 920 in connection with transaction conducted in the exchange 910. In one aspect, a benefit such as revenue is shared back to the value add brokers. For instance, audience broker 930a provides value by informing about specific users of advertising, display statistics broker 930b provides value informing about different display characteristics associated with advertisement space or advertisements, performance history broker 930c informs about various performance metrics, e.g., click through rates, or conversions for various advertising transactions of interest to participants, insurance broker 930d for brokering insurance for transactions, . . . , electronic trading broker 930n for performing financial transactions predicated on the marketplace represented by exchange 900.

Figure 10:
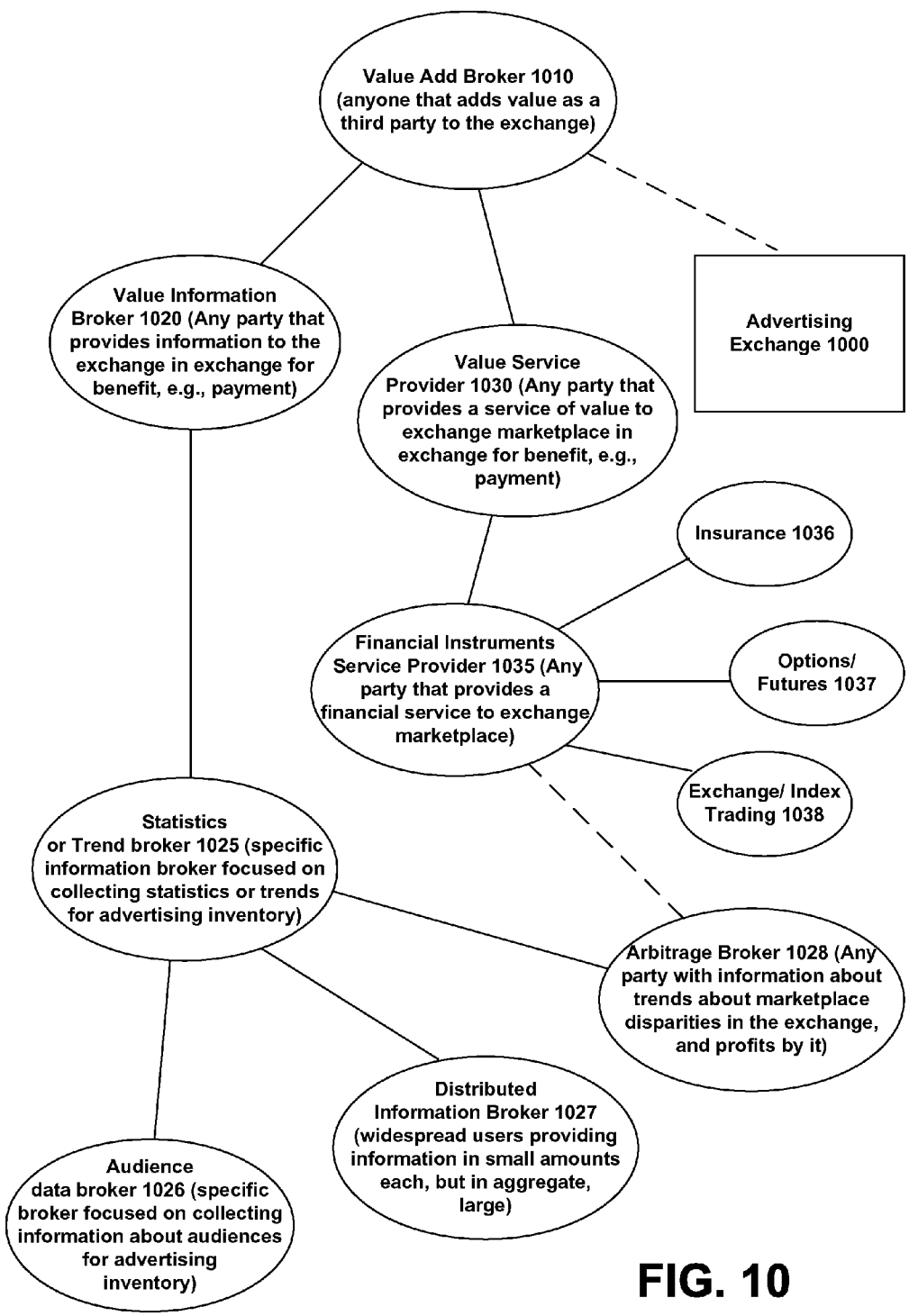
FIG. 10 is a block diagram of embodiments of an online advertising exchange including exemplary non-limiting categorization of value add brokers according to information and services in accordance with the invention.

FIG. 10 illustrates another exemplary, non-limiting taxonomy showing various types of value add brokers 1010 that may add value to transactions of a federated advertising exchange 1000 in accordance with the invention. Value add brokers 1010 thus encompass any party that adds value to exchange 1000. This generally includes value information broker 1020, which may be any party that provides information to the marketplace in exchange for a benefit, or a value service provider 1030 which is any party that provides a service of value to the marketplace in exchange for a benefit. Information broker 1020 may include a statistics or trend broker 1025, which is a subset of information brokers that focuses on collecting information and deriving statistical advantage with respect to transaction(s) in the advertising exchange 1000. Statistics broker 1025 can be further sub categorized into audience data broker 1026 that focuses on audience information, distributed information broker 1027 which focuses on collecting information from individuals (e.g., marketing information), arbitrage broker 1028 that attempts to profit in the marketplace by exploiting an insight into under or over valued inventory for transactions in the exchange 1000. Other kinds of statistics brokers 1025 may exist too, i.e., any information that would facilitate transactions in the exchange 1000 is a possible source for another specific statistic broker 1025 in accordance with the invention.

On the services side, as mentioned, value service provider 1030 may be any party that provides valuable services, which as a subset includes financial instruments service provider 1036, i.e., any party that provides a financial service to the marketplace in connection with one or more transactions taking place in exchange 1000. For some non-limiting examples, this includes insurance providers 1036, options/futures trading component 1037 and other electronic exchange/index financial trading component 1038. A value add broker 1010 can also be a combination of any of the foregoing as well. For instance, an arbitrage broker 1028 may typically negotiate one or more financial instruments from a provider 1035 as part of its interaction with exchange 1000.

Figure 11:
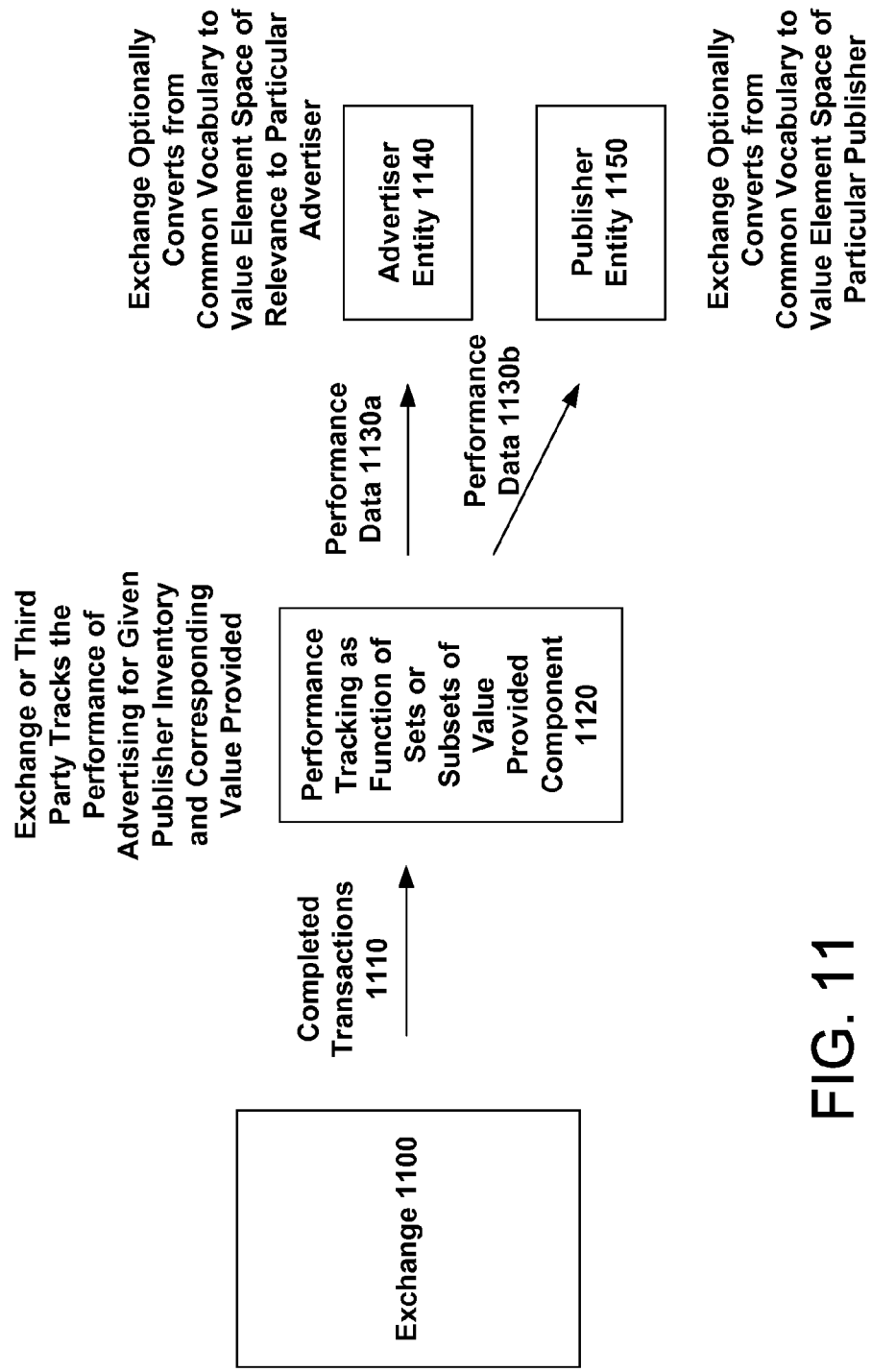
FIG. 11 is another exemplary non-limiting block diagram of embodiments of an online advertising exchange including value add brokers illustrating the tracking of the performance of value added in accordance with the invention.

FIG. 11 is a block diagram illustrating an aspect of the invention wherein the performance of completed transactions 1110 of exchange 1100 is recorded in accordance with the invention by performance tracking components 1120. As a result, performance data 1130*a* and 1130*b* can be made available to advertising entity 1140 or publisher entity 1150 respecting the reputation or trust level associated with value added to prospective transactions where the value add broker has past history with the exchange. Accordingly, the smartest value add brokers will be adding the most value to the transactions in the exchange over time, and will receive the most benefits in return by establishing a reputation for quality value provision. Optionally, the performance data 1130*a* and 1130*b* can be translated from common representations within the exchange 1100 to representations that are more meaningful to the participation goals of advertising entity 1140 or publisher entity 1150, respectively.

Figure 12:
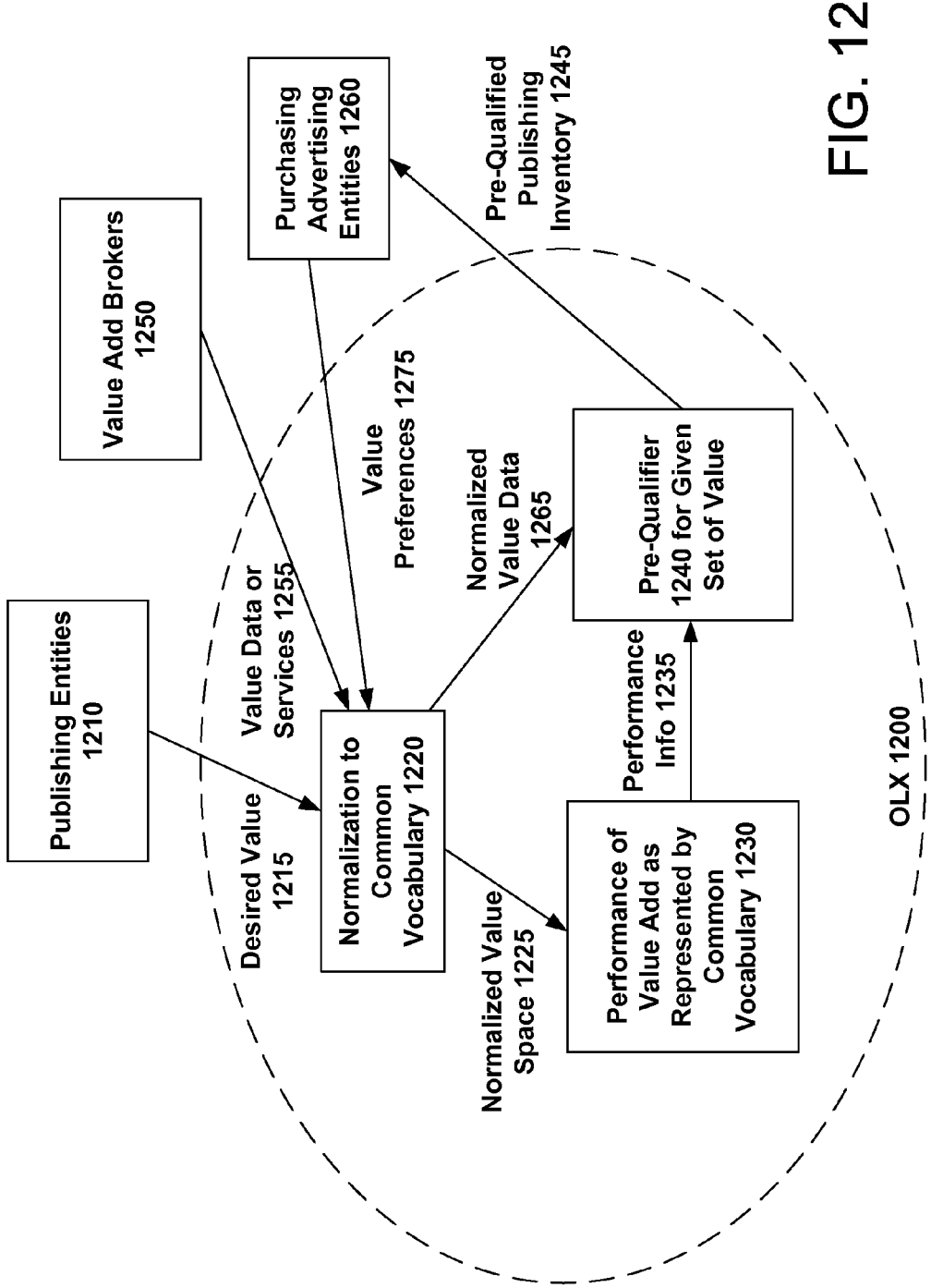
FIG. 12 is another exemplary non-limiting block diagram of embodiments of an online advertising exchange including value add brokers that help to form pre-qualified inventory in accordance with the invention.

A representative, non-limiting example of the operation of the value add brokering techniques of the invention in the context of generating pre-qualified inventory is shown in FIG. 12 including an exchange 1200 including publishing entities 1210 and advertising entities 1260. In accordance with the invention, the value collected from value add brokers 1250 can be used to pre-qualify inventory for certain characteristics once the performance of the inventory can be determined with reasonable levels of certainty. As shown, publishing entities 1210 express desired value 1215 for advertising transactions to exchange 1200. A normalization component 1220 translates the request for value to a common vocabulary. Also, value add brokers 1250 communicate with the normalization component 1220 to make matches between requested value and the capability of providing the value. Similarly, advertising entities specify value preferences 1275 for conducting transactions in the exchange 1200 that are normalized to the common vocabulary as well.

Then, in the embodiment of FIG. 12, the normalized value space 1225 and normalized value data 1265 can be used to pre-qualify inventory 1245 for purchase by advertising entities 1260. The performance of the normalized value space 1225 is measured over time by component 1230 generating performance information 1235. In this regard, when purchasing entities express value data 1265, a pre-qualify component 1240 uses the performance information 1235 to form a set of transactions that are pre-qualified for the value preferences of the advertising entities 1260. Accordingly, transactions are dynamically tailored to an advertising entity's pre-qualification needs to facilitate transactions by that advertising entity.

Figure 13:
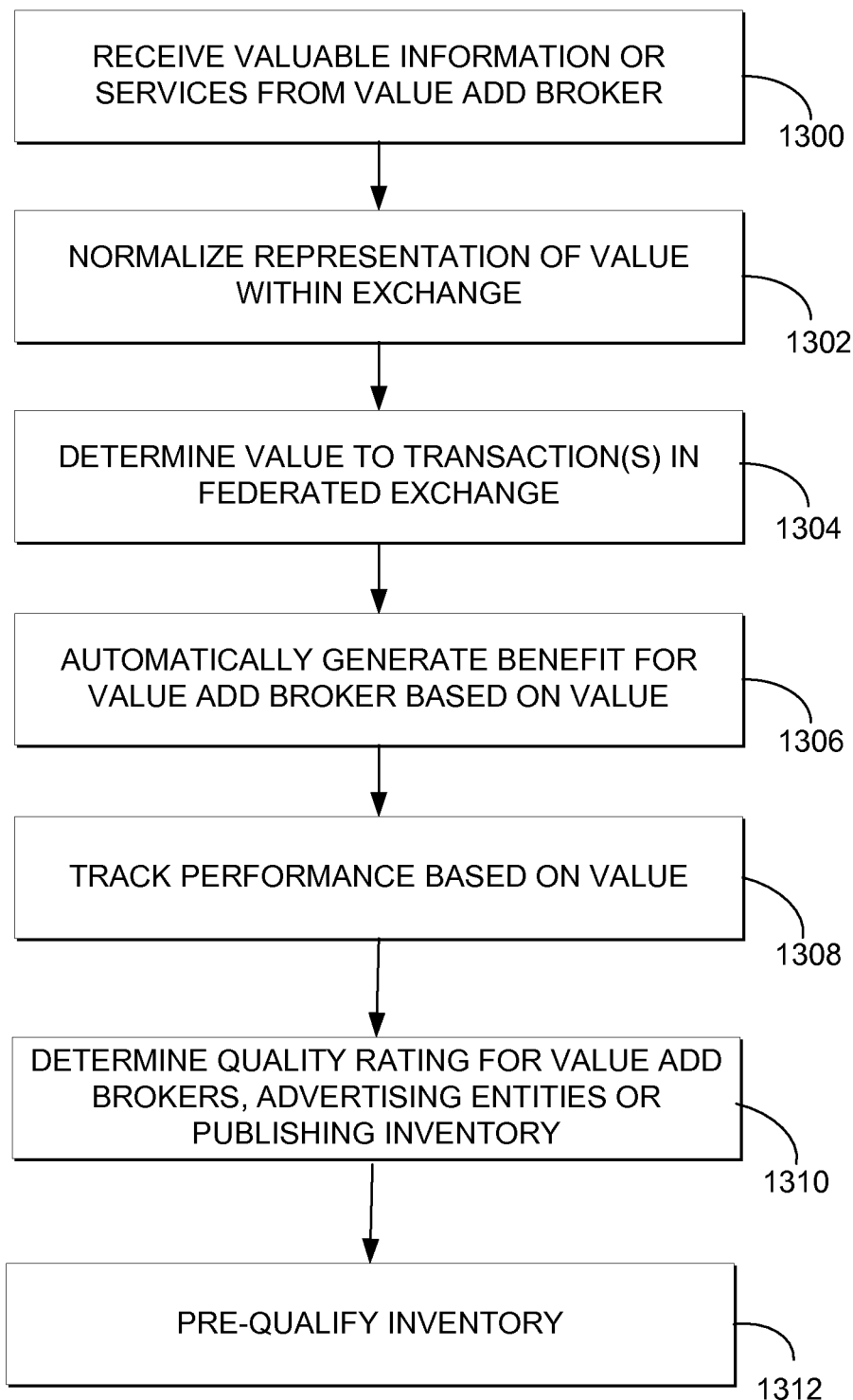
FIG. 13 is a flow diagram of exemplary non-limiting processes for an online advertising exchange including value add brokers from a perspective of the advertising exchange in accordance with the invention.

FIG. 13 is a flow diagram of exemplary non-limiting processes for an online advertising exchange including value add brokers from a perspective of the advertising exchange in accordance with the invention. At 1300, valuable information or services are received from a value add broker. At 1302, the representation of the value is normalized to common vocabulary within the exchange. Then, at 1304, the value of the information or services is determined in connection with one or more transactions conducted in the exchange. At 1306, a benefit for the value add broker is automatically generated commensurate with the value provided by the information or service. At 1308, the performance of value added to the exchange by value add broker is tracked over time. At 1310, based on performance history determined at 1308 and other information available, a quality rating for value add brokers, advertising entities or publishing entities can be determined. This helps participants achieve better expected results by understanding the quality of participants to the transaction.

The performance history determined at 1308 can also be used to pre-qualify publishing inventory for a set of statistically likely characteristics at 1312 ready for purchase by prospective advertisers interested in the set of statistically likely characteristics.

Figure 14:
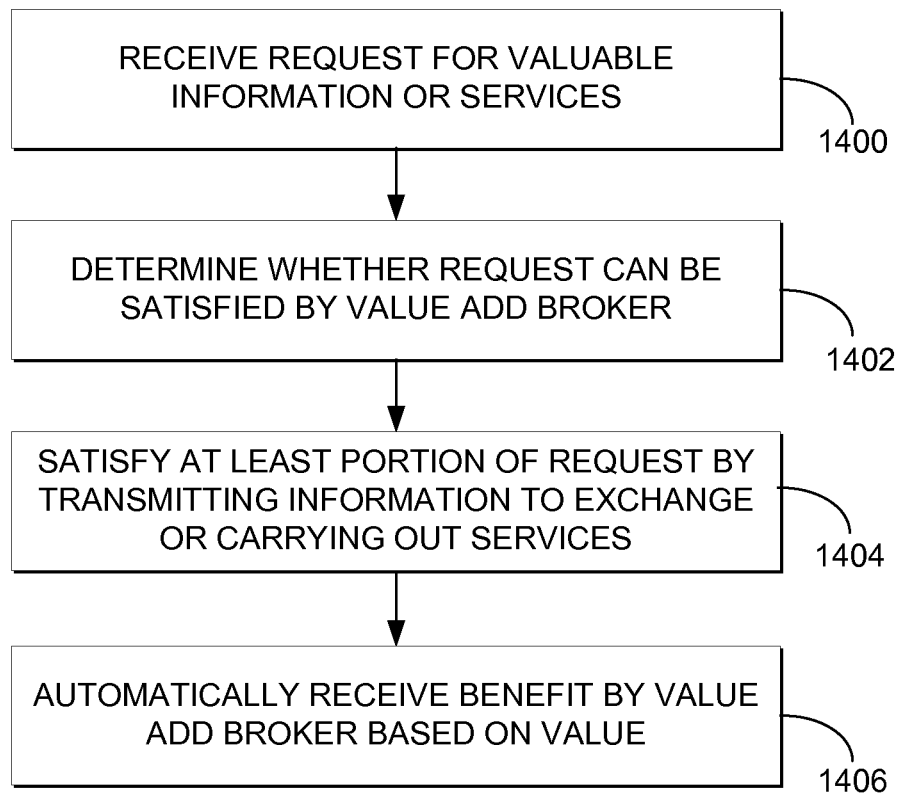
FIG. 14 is a flow diagram of exemplary non-limiting processes for an online advertising exchange including value add brokers from a perspective of a value add broker in accordance with the invention.

FIG. 14 is a flow diagram of exemplary non-limiting processes for an online advertising exchange including value add brokers from a perspective of a value add broker in accordance with the invention. At 1400, a value add broker receives a request from a federated advertising exchange for certain identifiable valuable information or services. At 1402, the value add broker determines whether the request can be satisfied within the means of the value add broker. If so, then at 1404, the value add broker satisfies at least a portion of the request by transmitting information to the exchange or by performing the relevant services and notifying the exchange when the services are completed. Then, at 1406, the value add broker is automatically credited with providing the value accruing a benefit to the value add broker.

The invention may also be implemented in a peer-to-peer architecture, wherein processing performed by the various embodiments of an exchange of the invention is shared across multiple participating machines. In such a non-limiting embodiment, each machine participating in the exchange network enabled by the invention can share some of the processing associated with normalization and tracking processes performed by the various embodiments of the on-line exchange of the invention.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

There are multiple ways of implementing the present invention, e.g., an appropriate API, tool kit, driver code, operating system, control, standalone or downloadable software object, etc. which enables applications and services to use the advertising techniques of the invention. The invention contemplates the use of the invention from the standpoint of an API (or other software object), as well as from a software or hardware object that operates according to any of the advertising techniques in accordance with the invention. Thus, various implementations of the invention described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the present invention have been described in connection with various computing devices and network architectures, the underlying concepts may be applied to any computing device or system in which it is desirable to advertise. While exemplary programming languages, names and/or examples are chosen herein as representative of various choices, these languages, names and examples are not intended to be limiting. One of ordinary skill in the art will also appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the advertising techniques of the present invention, e.g., through the use of a software object, data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to one or more of the figures. While for purposes of simplicity of explanation, in some cases, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular programming language constructs, the invention is not so limited, but rather may be implemented in any language to provide the disclosed embodiments for advertising methods. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for facilitating transactions for publishing inventory available in an advertising exchange including at least one publishing entity to represent at least one publisher and at least one advertising entity to represent at least one advertiser, wherein the advertising exchange federates at least two disparate advertising networks, comprising:
   communicating a request for information to a third party value add broker, the information being relevant to at least one potential advertising transaction within the advertising exchange, the request including information about the at least one potential advertising transaction;
   receiving, at one or more computing devices on which the advertising exchange is operating, the information from a value add broker that does not purchase or sell advertising in the advertising exchange;
   determining, at the one or more computing devices, a value of the information by auctioning the information to entities participating in a potential advertising transaction;
   completing the potential advertising transaction between the entities using the information; and
   automatically generating a benefit for the value add broker as a function of the value of the information or the services provided by the value add broker.

2. The method of claim 1, further comprising:
   normalizing a representation of the information or the services to a common vocabulary for representing information or services across different value add brokers in the advertising exchange.

3. The method of claim 1, further comprising:
   associating identifiers that identify a type of information or service associated with the information or the services.

4. The method of claim 1, further comprising:
   preserving privacy of the information received from the value add broker by obscuring an identity of a value add provider providing the information from the entities participating in the potential advertising transaction while maintaining the association from the information to the value add broker that provided the information for said generating step.

5. The method of claim 1, further comprising:
   automatically sharing the benefit to one or more value add providers that provided the information or the services to the value add broker as another function of the value of the information or services provided by the value add broker.

6. The method of claim 1, further comprising:
   automatically sharing revenue to one or more value add providers that provided the information or services to the value add broker as a function of the revenue generated by the information or services provided by the value add broker.

7. The method of claim 1, further including:
   tracking at least one performance metric that measures performance of information received from value add brokers.

8. The method of claim 1, further including:
   tracking at least one performance metric that measures performance of services carried out by value add brokers.

9. The method of claim 1, further including:
   determining a quality rating for each value add broker based on at least one performance metric that measures performance of information received from value add brokers.

10. A method for facilitating transactions for advertisement space in an advertising exchange that federates participants including publishers and advertisers from at least two disparate advertising networks, comprising:
    receiving, at one or more computing devices, a request for at least one piece of information or at least one service that is relevant to at least one potential advertising transaction for the advertisement space in the advertising exchange;
    processing, at the one or more computing devices, the request to determine whether a third party value add provider has access to one or more pieces of the at least one piece of information or can carry out one or more services of the at least one service to the advertising exchange in connection with the at least one potential advertising transaction, wherein the third party value add provider does not purchase or sell advertising in the advertising exchange;
    inputting, by the one or more computing devices, the one or more pieces of information into the advertising exchange or carrying out the one or more services, wherein the inputting or the carrying out is performed directly by the third party value add provider or indirectly through a value add broker that brokers on behalf of a plurality of value add providers, and wherein the information originates from an information broker that aggregated the information from a plurality of external information sources; and
    automatically receiving a benefit by the value add provider commensurate with the value obtained by auctioning the information or the service to entities participating in the at least one potential advertising transaction.

11. The method of claim 10, wherein the receiving includes automatically receiving revenue by the value add provider as the benefit.

12. The method of claim 10, further comprising:
    notifying the advertising exchange when the one or more services have been performed by the value add provider.

13. The method of claim 10, wherein the method further comprises determining a quality rating for one or more value add brokers based on at least one performance metric that measures performance of services carried out by the one or more value add brokers.

14. The method of claim 13, wherein the inputting include inputting by a statistics broker the one or more pieces of statistical trends to the advertising exchange compiled by the statistics broker based on a plurality of external information sources.

15. The method of claim 13, wherein the inputting include inputting by an audience data broker the one or more pieces of information about an audience for the advertisement space of the at least one advertising transaction conducted in the advertising exchange.

16. The method of claim 10, wherein the method further comprises determining a quality rating for one or more value add brokers based on at least one performance metric that measures performance of information received from the one or more value add brokers.

17. The method of claim 16, wherein the method further comprises, tracking at least one performance metric that measures performance of services carried out by value add brokers.

18. The method of claim 10, wherein the inputting includes inputting information that reduces the variance of outcome for expected results for one or more participants to the at least one potential transaction in the advertising exchange.

19. The method of claim 10, wherein the inputting includes inputting information about trust level for one or more participants to the at least one potential transaction in the advertising exchange to expose how much the one or more participants can be trusted based on past history.

20. A method for facilitating transactions for advertisement space in an advertising exchange that federates participants including publishers and advertisers from at least two disparate advertising networks, comprising:

receiving by a third party value add provider, at a computing device, a request for at least one service that is relevant to at least one potential advertising transaction for the advertisement space in the advertising exchange;

processing, at the computing device, the request to determine whether the third party value add provider can carry out one or more services of the at least one service to the advertising exchange in connection with the at least one potential advertising transaction, wherein the third party value add provider does not purchase or sell advertising in the advertising exchange;

carrying out, by the one or more computing devices, the one or more services by the value add provider, the one or more services pertaining to completion of the at least one potential advertising transaction in the advertising exchange; and automatically receiving a benefit by the value add provider that is commensurate with the value obtained by auctioning the service to entities participating in the at least one potential advertising transaction.

* * * * *